United States Patent
Bradley et al.

(10) Patent No.: US 12,418,517 B2
(45) Date of Patent: Sep. 16, 2025

(54) MEDIA INTERCOM OVER A SECURE DEVICE TO DEVICE COMMUNICATION CHANNEL

(71) Applicant: Apple Inc., Cupertino, CA (US)

(72) Inventors: Bob Bradley, San Jose, CA (US); Marc J. Krochmal, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 1542 days.

(21) Appl. No.: 16/586,538

(22) Filed: Sep. 27, 2019

(65) Prior Publication Data

US 2020/0127988 A1 Apr. 23, 2020

Related U.S. Application Data

(60) Provisional application No. 62/748,224, filed on Oct. 19, 2018.

(51) Int. Cl.
*H04L 9/40* (2022.01)
*G06F 3/16* (2006.01)
*G10L 15/22* (2006.01)

(52) U.S. Cl.
CPC ............. *H04L 63/08* (2013.01); *G06F 3/165* (2013.01); *G10L 15/22* (2013.01); *H04L 63/0428* (2013.01); *G10L 2015/223* (2013.01)

(58) Field of Classification Search
CPC ..... G06F 63/08; G06F 3/165; H04L 63/0428; G10L 15/22

(Continued)

(56) References Cited

U.S. PATENT DOCUMENTS 6,889,321 B1 * 5/2005 Kung .................. H04M 7/0078
713/153
8,654,936 B1 * 2/2014 Eslambolchi ........ H04M 11/007
379/88.04

(Continued)

FOREIGN PATENT DOCUMENTS

CN 101272384 A 9/2008
CN 101916106 A 12/2010

(Continued)

OTHER PUBLICATIONS

N/a N/a: "User Manual Arlo Baby 1080p HD Monitoring Camera", May 1, 2017, pp. 1-79, XP055647421, Retrieved from the Internet: URL: https://data2.manualslib.com/pdf6/126/12554/1255302-netgear/arlo_baby.pdf?bbe0f0d7e66f4130fc13c084cb57b174, retrieved on Nov. 28, 2019.

(Continued)

*Primary Examiner* — Dant B Shaifer Harriman
(74) *Attorney, Agent, or Firm* — BAKERHOSTETLER

(57) ABSTRACT

Embodiments described herein provide a communication mechanism that enables electronic device to perform device to device communication using a secure, encrypted, peer-to-peer data connection. The communication mechanism can also be used as a general-purpose communication mechanism that enables smart home device to exchange data, including configuration data. In one embodiment, the general-purpose communication mechanism can be leveraged to enable intercom-like transmission of audio or video data between electronic devices that are connected to the communication mechanism.

20 Claims, 21 Drawing Sheets

(58) Field of Classification Search
USPC .......................................................... 726/3
See application file for complete search history.

(56) References Cited

U.S. PATENT DOCUMENTS

| | | | |
|---|---|---|---|
| 9,053,124 B1 | 6/2015 | Dornquast et al. | |
| 9,100,828 B2 | 8/2015 | Dave et al. | |
| 9,262,612 B2 | 2/2016 | Cheyer | |
| 9,443,275 B1* | 9/2016 | O'Gwynn | G06Q 20/327 |
| 9,614,690 B2* | 4/2017 | Ehsani | H04M 1/72415 |
| 9,641,954 B1* | 5/2017 | Typrin | H04W 4/16 |
| 9,721,570 B1 | 8/2017 | Beal et al. | |
| 9,800,517 B1* | 10/2017 | Anderson | H04L 47/70 |
| 9,820,315 B2* | 11/2017 | Le Guen | H04W 12/06 |
| 10,157,042 B1 | 12/2018 | Jayakumar et al. | |
| 10,412,206 B1 | 9/2019 | Liang et al. | |
| 10,607,459 B1 | 3/2020 | Sanchez et al. | |
| 10,623,246 B1 | 4/2020 | Iyer et al. | |
| 10,880,284 B1 | 12/2020 | Hitchcock et al. | |
| 11,157,603 B2* | 10/2021 | Huh | G06F 21/45 |
| 11,282,314 B2* | 3/2022 | Schoenfelder | G06F 21/34 |
| 2003/0177012 A1* | 9/2003 | Drennan | G10L 15/26 704/275 |
| 2005/0120082 A1* | 6/2005 | Hesselink | H04L 67/1095 709/219 |
| 2005/0195691 A1 | 9/2005 | Arnold et al. | |
| 2005/0257752 A1* | 11/2005 | Langer | A01K 15/021 119/712 |
| 2006/0259767 A1 | 11/2006 | Mansz et al. | |
| 2007/0012793 A1* | 1/2007 | Flood | F23N 5/20 236/94 |
| 2010/0191352 A1* | 7/2010 | Quail | G05B 15/02 700/90 |
| 2011/0167355 A1 | 7/2011 | Shelansky et al. | |
| 2011/0185437 A1 | 7/2011 | Tran et al. | |
| 2011/0302318 A1 | 12/2011 | Birger | |
| 2014/0075385 A1 | 3/2014 | Wan et al. | |
| 2014/0094124 A1* | 4/2014 | Dave | H04W 8/20 455/41.2 |
| 2014/0136195 A1* | 5/2014 | Abdossalami | G10L 15/26 704/235 |
| 2014/0287687 A1 | 9/2014 | Bakin et al. | |
| 2014/0330560 A1* | 11/2014 | Venkatesha | G06F 3/167 704/235 |
| 2015/0053781 A1* | 2/2015 | Nelson | G10L 15/22 236/1 C |
| 2015/0058447 A1* | 2/2015 | Albisu | H04L 12/2818 709/219 |
| 2015/0161370 A1 | 6/2015 | North et al. | |
| 2015/0161882 A1* | 6/2015 | Lett | G08B 25/001 340/506 |
| 2015/0162006 A1 | 6/2015 | Kummer | |
| 2015/0213355 A1 | 7/2015 | Sharma et al. | |
| 2015/0215350 A1 | 7/2015 | Slayton et al. | |
| 2015/0222517 A1 | 8/2015 | McLaughlin et al. | |
| 2015/0256431 A1 | 9/2015 | Buchanan et al. | |
| 2015/0278531 A1 | 10/2015 | Smith et al. | |
| 2015/0312394 A1 | 10/2015 | Mirza et al. | |
| 2015/0347683 A1* | 12/2015 | Ansari | G16H 10/60 726/7 |
| 2015/0372999 A1* | 12/2015 | Pi-Sunyer | G05B 15/02 726/4 |
| 2016/0021327 A1* | 1/2016 | Wang | H04N 21/4113 348/734 |
| 2016/0057124 A1 | 2/2016 | Boyle et al. | |
| 2016/0165387 A1 | 6/2016 | Nhu | |
| 2016/0226823 A1* | 8/2016 | Ansari | H04L 41/12 |
| 2016/0313974 A1* | 10/2016 | Chang | G06Q 20/40145 |
| 2016/0358598 A1 | 12/2016 | Williams et al. | |
| 2016/0366373 A1* | 12/2016 | Siminoff | H04N 5/2257 |
| 2017/0025124 A1 | 1/2017 | Mixter et al. | |
| 2017/0026528 A1 | 1/2017 | Kim et al. | |
| 2017/0048376 A1 | 2/2017 | Logan | |
| 2017/0070491 A1* | 3/2017 | Logue | H04L 9/14 |
| 2017/0076263 A1 | 3/2017 | Bentz et al. | |
| 2017/0124842 A1 | 5/2017 | Sinha et al. | |
| 2017/0126674 A1 | 5/2017 | Lee | |
| 2017/0185376 A1 | 6/2017 | Chang et al. | |
| 2017/0188437 A1 | 6/2017 | Banta | |
| 2017/0223005 A1 | 8/2017 | Birgisson et al. | |
| 2017/0264673 A1 | 9/2017 | Yalunin | |
| 2017/0272784 A1* | 9/2017 | Shang | G02B 27/017 |
| 2018/0014189 A1 | 1/2018 | Ellison et al. | |
| 2018/0041830 A1* | 2/2018 | Shahamat | H04N 7/185 |
| 2018/0053401 A1 | 2/2018 | Martin et al. | |
| 2018/0081523 A1 | 3/2018 | Beaumont et al. | |
| 2018/0206122 A1 | 7/2018 | Bradley et al. | |
| 2018/0253666 A1 | 9/2018 | Fix | |
| 2018/0309866 A1 | 10/2018 | Devaraj et al. | |
| 2018/0338241 A1* | 11/2018 | Li | H04W 12/08 |
| 2019/0056905 A1* | 2/2019 | Rose | G06F 3/167 |
| 2019/0098037 A1 | 3/2019 | Shenoy, Jr. et al. | |
| 2019/0122001 A1 | 4/2019 | Bradley et al. | |
| 2019/0124049 A1 | 4/2019 | Bradley et al. | |
| 2019/0295542 A1* | 9/2019 | Huang | G06F 3/167 |
| 2019/0297034 A1 | 9/2019 | Gupta et al. | |
| 2020/0103486 A1* | 4/2020 | Knaappila | H04R 3/12 |
| 2020/0120094 A1 | 4/2020 | Jain et al. | |
| 2022/0027447 A1* | 1/2022 | Keith, Jr. | H04L 63/0421 |

FOREIGN PATENT DOCUMENTS

| | | |
|---|---|---|
| CN | 103226949 A | 7/2013 |
| CN | 104320494 A | 1/2015 |
| CN | 104516845 A | 4/2015 |
| CN | 105432091 A | 3/2016 |
| CN | 105959111 A | 9/2016 |
| CN | 106506688 A | 3/2017 |
| CN | 106845193 A | 6/2017 |
| CN | 107342994 A | 11/2017 |
| CN | 206948586 U | 1/2018 |
| CN | 207022109 U | 2/2018 |
| CN | 108574515 A | 9/2018 |
| CN | 108604181 A | 9/2018 |
| GB | 2483120 A | 2/2012 |
| WO | WO2016126151 A1 | 8/2016 |
| WO | 2016200470 A1 | 12/2016 |
| WO | 2017131887 A1 | 8/2017 |
| WO | 2019079015 | 4/2019 |
| WO | 2019079017 | 4/2019 |
| WO | 2020081374 | 4/2020 |

OTHER PUBLICATIONS

PCT/US2019/055718, "Notification of Transmittal of the International Search Report and Written Opinion of the International Searching Authority, or the Declaration" mailed Dec. 5, 2019, 14 pgs.
PCT/US2018/053371, International Search Report and Written Opinion, mailed Nov. 19, 2018, 10 pgs.
Anonymous: "Bluetooth-Wikipedia", Oct. 7, 2017 (Oct. 7, 2017), XP055552456, Retrieved from the Internet: URL: https://en.wikipedia.org/w/index.php?tille=Bluetooth&oldid=804205348 [retrieved on Feb. 14, 2019].
PCT/US2018/053204, International Search Report and Written Opinion, mailed Feb. 13, 2019, 18 pgs.
Nguyen, Xuan Thang, and Ryszard Kowalczyk. "An agent based qos conflict mediation framework for web services compositions." In 2006 IEEE/WIC/ACM International Conference on Intelligent Agent Technology, pp. 522-528. IEEE, 2006. (Year: 2006).
Pereira, Sancha, Andre Alves, Nuno Santos, and Ricardo Chaves. "Storekeeper: A Security-Enhanced Cloud Storage Aggregation Service." In 2016 IEEE 35th Symposium on Reliable Distributed Systems (SRDS), pp. 111-120. IEEE, 2016. (Year: 2016).
Chinese Office Action from Chinese Patent Application No. 201980067343.0, dated Jan. 24, 2024, 22 pages including machine-generated English language translation.
Dong, "Design and realization on system of intelligent home based on Android," Electronic Design Engineering, Dec. 2017, 4 pages with English abstract.

(56) References Cited

OTHER PUBLICATIONS

Chinese Office Action from Chinese Patent Application No. 201980067343.0, dated Jun. 18, 2024, 17 pages including English language summary.

\* cited by examiner

MEDIA INTERCOM OVER A SECURE DEVICE TO DEVICE COMMUNICATION CHANNEL

CROSS-REFERENCE

This application claims benefit of U.S. Provisional Patent Application No. 62/748,224 filed Oct. 19, 2018, which is hereby incorporated herein by reference. This application is related to U.S. Provisional Patent Application No. 62/575,373 filed Oct. 21, 2017 and U.S. patent application Ser. No. 16/147,224 filed Sep. 28, 2018, which are hereby incorporated herein by reference to the extent not inconsistent with the present disclosure.

BACKGROUND OF THE DISCLOSURE

Electronic devices known in the art can include an intelligent automated assistant system that can engage with a user of an electronic device. Generally, intelligent automated assistant systems provide a digital or virtual assistant that can perform actions on the electronic device or provide the user with requested information. These automated assistants can control many operations and functions of an electronic device, such as to dial a telephone number, send a text message, set reminders, add events to a calendar, and perform various other operations on behalf of a user. The automated assistant systems can receive spoken, natural language commands from a user and can speak responses to the user that are generated using a speech synthesis engine.

The services and operations for the automated assistants can be classified into various domains that describe an area of service for the automated assistant. Enabling complete functionality within certain domains may require access to personal or private data associated with, or specific to a user of the electronic device. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DESCRIPTION

Embodiments described herein provide a communication mechanism that enables electronic device to perform device to device communication using a secure, encrypted, peer-to-peer data connection. The communication mechanism can also be used as a general-purpose communication mechanism that enables smart home device to exchange data, including configuration data. In one embodiment, the general-purpose communication mechanism can be leveraged to enable intercom-like transmission of audio or video data between electronic devices that are connected to the communication mechanism.

One embodiment provides for an electronic device comprising a network interface coupled with a bus, a microphone coupled with the bus, a non-transitory machine-readable medium coupled with the bus, and one or more processors coupled with the bus. The one or more processors can execute instructions stored on the non-transitory machine readable medium, wherein the instructions are to provide an application programming interface (API) to cause the one or more processors to stream intercom media data from the electronic device to a smart home device connected via the network interface. To stream the intercom media data, the one or more processors are to transmit a buffer of media data to the smart home device via the network interface over a secure connection established with the smart home device. The secure connection can be established with the smart home device via the API. The buffer of media data includes audio data captured via the microphone. The audio data is live or substantially live audio data that is captured contemporaneously in time with the transmission of the buffer. In one embodiment, the media data can also include video data captured via a camera on the electronic device.

One embodiment provides for a non-transitory machine-readable medium storing instructions to cause one or more processors of a smart home device to perform operations comprising receiving a request to initiate an intercom media stream from a remote smart home device to the smart home device, verifying a secure connection between the remote smart home device and the smart device, wherein the secure connection is an encrypted peer-to-peer connection, activating a media session for the intercom media stream, the media session established with the remote smart home device, receiving recorded media from the remote smart home device, and playing the recorded media via an output device of the smart home device.

Other features of the present embodiments will be apparent from the accompanying drawings and from the detailed description, which follows.

BRIEF DESCRIPTION OF THE DRAWINGS

Embodiments of the present invention are illustrated by way of example, and not limitation, in the figures of the accompanying drawings in which reference numbers are indicative of origin figure, like references may indicate similar elements, and in which.

DETAILED DESCRIPTION

Figure 1A:
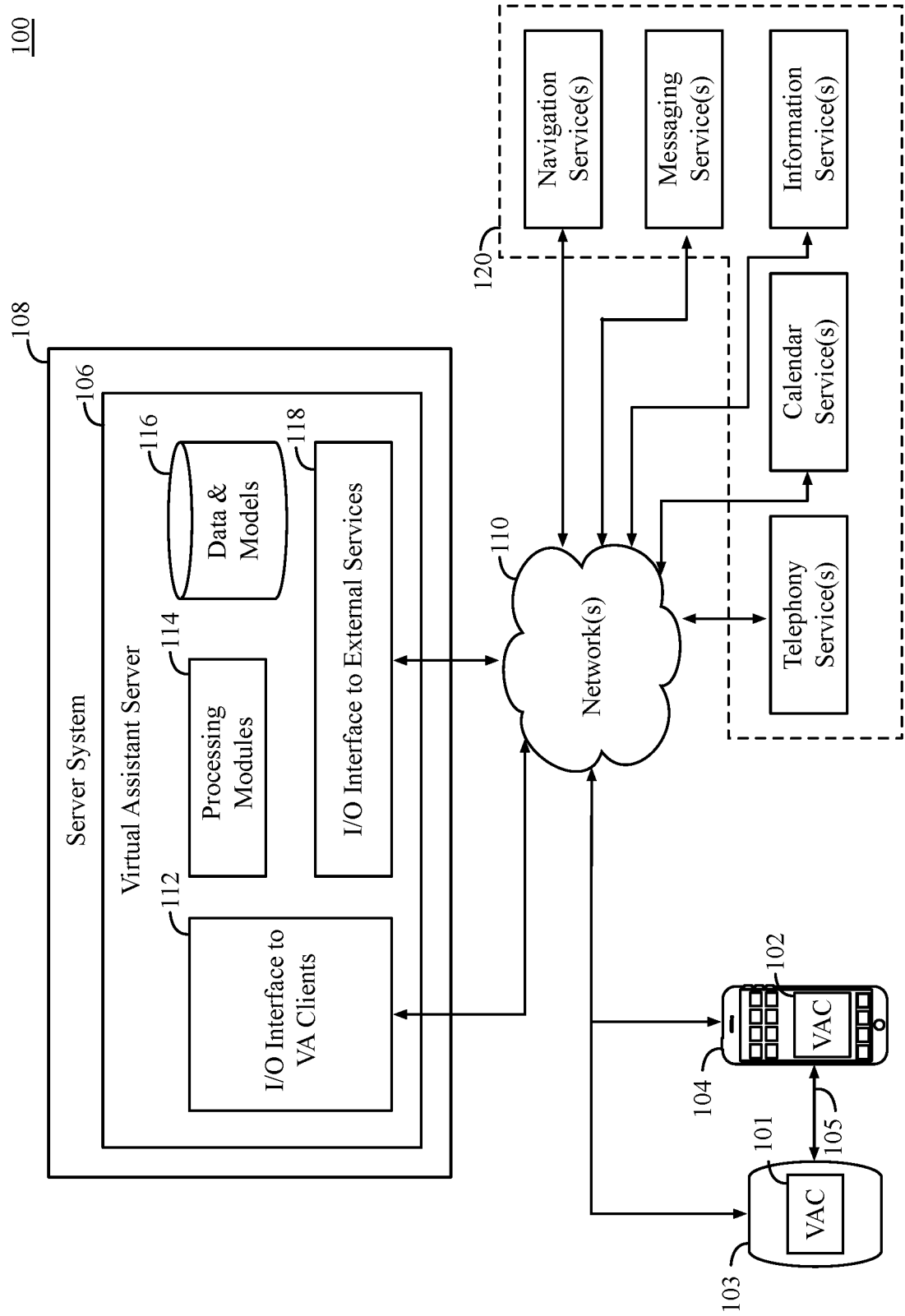
FIGS. 1A-1B illustrates block diagrams of electronic device systems to enable virtual assistants and personal data domains, according to embodiments.

A network of connected smart home devices can include a communal device that is used by multiple users within a household. As the device is a communal device having multiple users, it may be beneficial to avoid storing personal information that is specific to any given user of the device. Furthermore, it may be beneficial to prevent a user from perfuming unauthorized queries regarding the personal data of other users of the communal device. In some embodiments, some user data is considered inherently personal or private, while other information can be designated as personal or private information by a user. To maintain the security of such data, communications between a smart home device and a companion device can be performed using a secure device connection that enables an encrypted peer-to-peer data and messaging channel. Exemplary personal or private user information associated with each user of the communal device can include, but is not limited to contact lists, calendar entries, text messages, e-mails, call history, alarms, reminders, and other electronic data that may be considered personal or private user data. In various embodiments, additional personal or private information can include, but is not limited to location information, family relationships, user preferences, application information, data stored on personal device, device location, family device locations, medical information, or health information.

Communication between a communal smart home device and a companion device can be performed on a secure data channel referred to as a companion link. The companion link provides a persistent, low-latency messaging system for connected devices within a home network environment. In some embodiments, the companion link supports the linking of stationary communal devices within a home, such as speaker devices, with personal mobile devices in the home or reachable via the Internet. The companion link enables, for example, a communal smart home device to redirect of personal requests, which the communal device otherwise cannot handle due to privacy concerns, to one or more personal devices.

In addition to enabling the redirection of personal queries to companion devices, in one embodiment the companion link also provides a general-purpose messaging system for devices within the home network environment. The general-purpose messaging system enables multiple smart home devices to work in concert by exchanging messages over the companion link. For example, audio playback between multiple smart speaker devices can be coordinated to enable the devices to perform operations such as, but not limited to coordinating playback of media items, selectively providing audio notifications to a user via the speaker closets to a user, configuring multiple speakers into a multi-channel audio system, or coordinating audio ducking at a speaker during the duration of a spoken request and response.

Communal devices can advertise support for the companion link service over a discovery protocol. Personal user devices on the same network as the communal device can discover the companion link service advertised by the communal device and connect with the communal device using advertised information. The personal device can perform a pairing process with the communal device to become a companion device for a user. In one embodiment, the pairing process includes a proximity element in which the user device exchanges identifiers, keys, or secrets with the companion device over a short-range wireless communication mechanism. The pairing process can also include the exchange of presence and reachability information that can facilitate subsequent connections between communal and companion devices over the companion link.

In a further embodiment, the companion link can be used to enable a media intercom system between smart home devices. The media intercom system can be implemented within the companion-link framework, without requiring extensive additional program logic at higher operating system levels. The libraries and daemons that enable companion link communication can provide an application programming interface (API) that enables smart home devices to form an intercom system, by which audio and/or video data can be streamed between smart home devices. The data of the intercom media stream is encrypted and transmitted securely over the companion link. An intercom stream initiator at one smart home device can enable a live audio and/or video stream to be transmitted to multiple other smart home devices. In one embodiment an intercom media stream can be initiated remotely, enabling an audio or video stream from a remote smart home device to be transmitted to a smart home device that is local or proximate to an initiating user. The initiation and termination of an intercom media stream can be performed using a virtual assistant that executes on the smart home devices. For example, a voice command can be provided to the virtual assistant to specify an intent to initiate an intercom media stream to a set of remote smart home devices or from a remote smart home device to a local smart home device.

In the figures and description to follow, reference numbers are indicative of the figure in which the referenced element is introduced, such that an element having a reference number of N00 is first introduced in FIG. N. For example, an element having a reference number between 100 and 199 is first shown in FIG. 1, while an element having a reference number between 200 and 299 is first shown in FIG. 2, etc. Within a description of a given figure, previously introduced elements may or may not be referenced.

The processes and operations depicted in the figures that follow can be performed via processing logic that includes hardware (e.g. circuitry, dedicated logic, etc.), software (as instructions on a non-transitory machine-readable storage medium), or a combination of both hardware and software. Although some of the processes are described below in terms of sequential operations, it should be appreciated that some of the operations described may be performed in a different order. Moreover, some operations may be performed in parallel rather than sequentially. Additionally, some operations may be indicated as optional and are not performed by all embodiments.

System and Environment

Figure 1B:
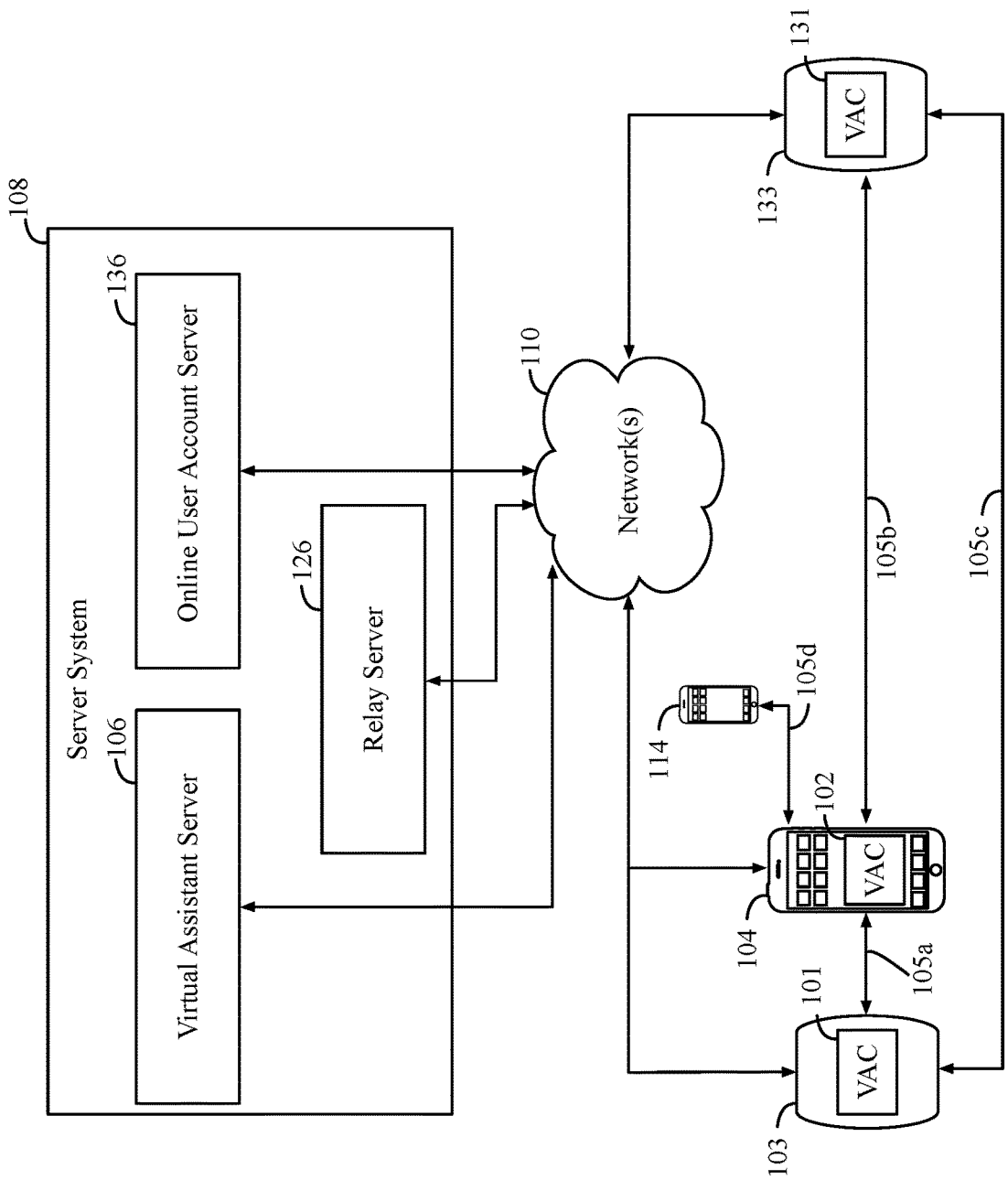

FIGS. 1A-1B illustrates block diagrams of electronic device systems to enable virtual assistants and personal data domains, according to embodiments. FIG. 1A illustrates a block diagram of a virtual assistant system 100, according to embodiments described herein. FIG. 1B illustrates a block diagram of a companion link system 130 to enable communication between devices within a virtual assistant system 100, according to embodiments. The companion link system 130 of FIG. 1B can be used to establish a personal data domain within the virtual assistant system to enable a virtual assistant on a communal device to answer queries that require access to personal user data that is not stored on the communal device. The block diagrams of FIGS. 1A-1B are in part logical, in that some components illustrated may separate logical components that reside within the same physical server or device.

FIG. 1A illustrates a virtual assistant system 100 that provides a processing system that interprets natural language input that is received in spoken and/or textual form to infer user intent. The virtual assistant system 100 can then perform actions based on the inferred user intent. In various embodiments, the system can perform a set of operations including, but not limited to identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form. As used herein, term virtual assistant can be used interchangeably with the terms" digital assistant," "intelligent automated assistant," or "automatic digital assistant," and generally refers to any information processing system that interprets natural language input in spoken and/or textual form to perform actions on behalf of a user.

A virtual assistant can accept a user request at least partially in the form of a natural language command, request, statement, narrative, and/or inquiry. Typically, the user request can seek either an informational answer or performance of a task by the virtual assistant. A satisfactory response to the user request can be a provision of the requested informational answer, a performance of the requested task, or a combination of the two. For example, a user can ask the virtual assistant a question, such as "Where am I right now?" Based on the user's current location, the virtual assistant can answer, "You are in Golden Gate Park near the west entrance." The user can also request the performance of a task, for example, "Please invite my friends to my girlfriend's birthday party next week." In response, the virtual assistant can acknowledge the request by saying "Yes, right away," and then send a suitable calendar invite on behalf of the user to each of the user's friends listed in the user's electronic address book. During performance of a requested task, the virtual assistant can sometimes interact with the user in a continuous dialogue involving multiple exchanges of information over an extended period of time. There are numerous other ways of interacting with a virtual assistant to request information or performance of various tasks. In addition to providing verbal responses and taking programmed actions, the virtual assistant can also provide responses in other visual or audio forms, e.g., as text, alerts, music, videos, animations, etc.

As shown in FIG. 1A, the virtual assistant system 100 can include a server system 108 having one or more server devices. In one embodiment, the server system 108 includes a virtual assistant server 106 that can communicate with multiple virtual assistant clients (VAC) (e.g., VAC 101. VAC 102). The virtual assistant clients can execute on multiple electronic devices that can connect and communicate with the server system 108. A first virtual assistant client (e.g., VAC 101) can execute on a smart home device 103, such as a smart speaker device. A second virtual assistant client (e.g., VAC 102) can execute on a user device 104, such as a smartphone device. The virtual assistant clients can communicate with the virtual assistant server 106 through one or more networks 110, which can include a combination of local and wide area networks. The various virtual assistant clients can provide client-side functionality, such as user-facing input and output processing, and can communicate with the virtual assistant server 106. The virtual assistant server 106 can provide server-side functionalities a multitude of virtual assistant clients residing on any number of user devices connected via the one or more networks 110.

In one embodiment, the virtual assistant server 106 includes an I/O interface to VA clients 112, one or more processing modules 114, storage devices including data and processing models 116, and an I/O interface to external services 118. The I/O interface to VA clients 112 can facilitate the client-facing input and output processing for the virtual assistant server 106. The one or more processing modules 114 can utilize the data and processing models 116 to perform natural language processing on speech input to infer a user's intent. The one or more processing modules 114 can then perform task execution based on the inferred user intent. The I/O interface to external services 118 can facilitate communication between the virtual assistant server 106 and external services 120 through one or more networks 110. In one embodiment, the virtual assistant server 106 can communicate with the external services 120 to complete tasks in response to requests received the VAC 102 on the user device 104, or to acquire information in response to a query received at the VAC 102. External services 120 can include, but are not limited to, navigation service(s), messaging service(s), information service(s), calendar service(s), and/or telephony services(s), and the like. For example, one or more navigation services can be used to enable turn-by-turn navigation on the user device 104 in response to a request received at the VAC 102 on the user device. External services can additionally include location information, weather, financial information, or account information. In various embodiments, logic to enable some of the external services 120 can reside within the server system 108, while some parts of the logic can reside within the user device 104.

The virtual assistant server 106 can communicate with one or more messaging services to send messages in response to speech input received from a virtual assistant client. Information service(s) such as Internet search engines or information databases can be accessed by the virtual assistant server 106 to provide information to a user in response to an information query. In one embodiment, the virtual assistant server 106 can access one or more calendar services to schedule a task or event, or to satisfy queries with respect to a task or event. The virtual assistant server 106 can also access one or more telephony services to initiate telephone calls for a user.

In various embodiments, the virtual assistant server 106 can assist the VAC 101, 102 by processing of speech input provided to the client by a user. In one embodiment, text to speech processing and natural language processing can be performed in part by the VAC 101, 102 and in part on the virtual assistant server 106. The data and processing models 116 of the virtual assistant server 106 may be more complex and higher performance than corresponding models that are locally accessible to VAC 101, 102. Accordingly, the virtual assistant server 106 may be more suitable for processing some commands and can send the results of the processed commands back to the VAC 101, 102 over the one or more networks 110. The operations to construct the virtual assistant interaction flow presented to a user can be shared between the virtual assistant server 106 and the VAC 101, 102. In one embodiment, initial processing of user input, presentation of speech output, and access to most user data can be performed by the VAC 101, 102. In such embodiment, speech recognition and natural language processing can be performed at least in part by the virtual assistant server 106.

The smart home device 103 and the user device 104 can communicate with each other and the server system 108 via one or more networks 110 local area networks (LAN) and/or wide area networks (WAN), e.g., the Internet. The one or more networks can be implemented using any known interconnect or network protocol, including various wired or wireless protocols. Exemplary interconnect and/or network protocols include Ethernet, Universal Serial Bus (USB), FIREWIRE, Global System for Mobile Communications (GSM), Enhanced Data GSM Environment (EDGE), code division multiple access (CDMA), time division multiple access (TDMA), Long Term Evolution (LTE), Bluetooth, Wi-Fi, voice over Internet Protocol (VoIP), Wi-MAX, or any other suitable communication protocol.

In various embodiments, the server system 108 can be implemented on a standalone data processing apparatus or a distributed network of computers. In some examples, server system 108 can also employ various virtual devices and/or services of third-party service providers (e.g., third-party cloud service providers) to provide the underlying computing resources and/or infrastructure resources of server system 108.

The smart home device 103, in various embodiments, can be a smart speaker device, smart home hub device, smart home appliance, or another type of intelligent electronic appliance or device. For example, and in one embodiment the smart home device 103 is a smart speaker device that can be configured to be part of a distributed media playback system. A specific example of a smart speaker device is the HomePod® smart speaker device from Apple Inc. of Cupertino, California. In one embodiment, the smart home device 103 can be a smart home hub device that is configured to manage one or more other devices in a digitally connected smart home system including, but not limited to intelligent and/or digitally connected devices such as a smart thermostat or smart lighting system. The smart home device 103 can connect with the user device 104 to exchange data. The connection between the smart home device 103 and the user device 104 can be performed over the one or more networks 110. In one embodiment, the smart home device 103 and the user device 104 can dynamically maintain a persistent connection as the user device 104 transitions between LAN and Internet connections.

The user device 104 can be any suitable electronic device. For example, and in one embodiment the user device 104 can be a portable multifunctional device, a multifunctional device, or a personal electronic device. A portable multifunctional device can be, for example, a mobile telephone that also contains other functions, such as a personal data assistant, a music player, and/or an application processor capable of executing applications (e.g., apps, etc.). Specific examples of portable multifunction devices can include the iPhone®, iPod Touch®, and iPad® devices from Apple Inc. of Cupertino, California. Other examples of portable multifunction devices can include, without limitation, laptop or tablet computers, or a wearable electronic device such as a smart watch device. In some embodiments, the user device 104 can be a non-portable multifunctional device such as, but not limited to a desktop computer, game console, television, or television set-top box. In one embodiment, the user device 104 can be a fixture in a home, vehicle, motor home, etc. In some embodiments, the user device 104 can be or work in conjunction with a door or another point of entry for a vehicle, home, or mobile home.

The user device 104 can include a touch-sensitive surface (e.g., touch screen displays and/or touchpad interfaces), or one or more physical user-interface devices such as a physical keyboard, mouse, and/or joystick.

In one embodiment, the VAC 101 on the smart home device 103 can communicate with the VAC 102 on the user device 104 to facilitate the processing of speech input or to infer an intent of a command received at the smart home device 103. For example, in one embodiment the smart home device 103 can be a communal device that is used by multiple users within a household. Certain personal or private information for users of the communal device, such as contact information, calendar information, message data, etc., can be classified as private for a given user. To avoid storing such private information on a smart home device 103 that is a communal device or enabling a communal device to access servers containing or having access to such information (e.g., the virtual assistant server 106), the VAC 101 on the smart home device 103 can be associated with a user device 104 that can facilitate access to such information. When the VAC 101 on the smart home device 103 is to perform a command or action that requires access to private information associated with a user, the VAC 101 on the smart home device 103 can communicate with the user device 104 and/or the VAC 102 on the user device 104 to acquire information used to perform the requested command or action.

A single user can be associated with multiple user devices 104. In such circumstance, a single instance of the user device 104 may be designated as a companion device. The smart home device 103 will then communicate with the companion device to enable the processing of certain requests. For example, a user can have multiple instances of the user device 104, such as one or more smartphone devices, one or more tablet devices, or a laptop device. The user can designate one of such user devices 104 as a companion device to which the smart home device 103 will communicate to acquire access to private user information.

In some embodiments, the smart home device 103 and the user device 104 can establish and maintain a companion link 105, which is a persistent or semi-persistent connection that enables the VAC 101 on the smart home device 103 to query the user device 104 and/or the VAC 102 on the user device 104 for private information. In one embodiment, the companion link 105 is an always-connected, low-latency messaging system that enables communication between devices within a home. Such connection can be maintained locally over a LAN or can be established over a wide area network, such as the Internet. The companion link 105 can enable communal devices to redirect personal requests to a user device, such that the requests can be processed in a privacy-preserving manner. The companion link 105 can also enable general-purpose device to device messaging. In one embodiment the companion link 105 can be used to enable intercom media streaming between smart home devices.

FIG. 1B illustrates a companion link system 130 of FIG. 1B that enables communication between devices within the virtual assistant system 100. In various embodiments, the companion link system 130 can enable secure and authenticated message exchange between multiple devices. The multiple devices can include one or more user devices (e.g., user device 104, user device 115), which each may be a portable multifunctional device. The multiple devices can also include one or more stationary devices, such as one or more communal smart home devices (e.g., smart home device 103, smart home device 133) that may be used by multiple users. In one embodiment a set of companion links 105a-105b can enable message-based communication between a user device and one or more communal smart home devices. A companion link 105c can also be established between communal smart home devices to enable communication between those devices. In one embodiment, a companion link 105d can also be established between user devices to enable peer-to-peer exchange of device data.

In one embodiment, the set of companion links 105a-105b can be used to enable communal stationary devices to redirect personal requests to a personal device associated with a user, to enable such request to be processed in a privacy-preserving manner. For example, and in one embodiment, a user may speak a personal query, to a communal device, such as "When is my next meeting?" The personal query can be received by the VAC 101 or VAC 131 on smart home device 103 or smart home device 133. As such request makes use of the speaking person's calendar, the communal device may not have direct access to such personal data. To satisfy such a request, the communal device can redirect the query to a designated companion device, such as user device 104, to perform analysis of the query and generate an audio response that can be sent back to the communal device for playback to the user.

In various embodiments, the redirection can be performed in an explicit or implicit manner. For an explicit redirection, the VAC 101 on smart home device 103 or the VAC 131 on smart home device 133 can receive a request and submit the request, at least in part, to the virtual assistant server 106 for processing. The virtual assistant server 106 can determine that to satisfy the request, at least some information may be required from the companion device (e.g., user device 104). In one embodiment, an explicit redirection can be performed in response to such determination in which the virtual assistant server 106 can send a request to the user device 104, over the one or more networks 110, to retrieve personal information that will be used to process the request. In one embodiment, a communal smart home device can use an implicit redirection in which the virtual assistant client on the smart home device 103 can redirect the virtual assistant request to the VAC 102 on the user device 104. The VAC 102 on the user device 104 can then process the request as though the request were received directly at the user device 104. The user device 104 can then formulate an audio response for playback on the communal device.

In addition to enabling the processing of queries in a privacy preserving manner, in one embodiment a companion link 105c can enable general purpose messaging that enables communication between communal devices, such as smart home device 103 and smart home device 133. Such link enables the communal devices to work in concert to coordinate operation. For example, smart home device 103 and smart home device 133 may be configured as part of a distributed media playback system that can play music or other media. The companion link 105c established between smart home device 103 and smart home device 133 can be used to coordinate media playback or to coordinate multi-channel audio playback over the multiple devices. When a user speaks a query to one of the smart home devices, the devices can exchange messages to coordinate ducking of audio playback for the duration of the spoken request and any associated audio responses. Using the companion link system 130, any number of communal smart home devices and user devices can communicate to exchange audio data, media playlists, configuration data, and other information used to enable a connected digital home system.

In one embodiment, companion links 105a-105d can be established over a local network connection (e.g., LAN) via a local wired and/or wireless network connection. In one embodiment, the companion links 105a-105d can also be established over a WAN connection, such as an Internet connection, although policy and configuration determinations may optionally be configured to limit the companion link 105c between smart home devices 103, 133 to a single network. In one embodiment, in addition to the virtual assistant server 106, the server system 108 can include an online user account server 136 to which user devices 104, 115 and smart home devices 103, 133 can connect via the one or more networks 110. The online user account server 136 can include information associated with an online user account of a user associated with the various devices. In some embodiments, the online user account server 136 can also include or be associated with server hardware and software logic to provide online services including online storage, messaging, e-mail, media and streaming services, or navigation services. In one embodiment, the online user account server 136 can also provide or facilitate access to one or more of the external services 120 of FIG. 1B. In one embodiment, the online user account server 136 can also provide or facilitate access to an online store, such as an online application store (e.g., app store) and/or an online media store, such as a music, video, or e-book store.

In one embodiment, a companion link 105d between user devices 104, 115 can be used to enable peer-to-peer data exchange. In one embodiment, automatic data exchanges between the devices can be configured to be performed over the companion link 105d. For example, where user device 104 and user device 115 are each associated with the same account on the online user account server 136, a credential exchange can be performed via the online account server to enable the automatic establishment of an encrypted communication channel between the devices whenever the devices are within direct communication range. In one embodiment, data for cloud services associated with the online user account server 136 can be exchanged between devices over the companion link 105d instead of over the one or more networks 110. In one embodiment, the online user account server 136 can maintain a list of devices associated with a single account or a list of devices associated with a family of associated accounts. The list of devices associated with an account of family of accounts can be used to facilitate device discovery and the establishment of companion link connections between devices. The accounts on the online account server can enable mutual authentication between the electronic devices via an exchange of authentication credentials.

In one embodiment, the online user account server 136 includes or is associated with a registration server to register a unique device identifier associated with each device with an online account associated with a user. Once a device has been registered with an online account of a user, an identifier token can be created that enables the device to be located and identified over the networks 110. The identifier token can include one or more cryptographic keys, tokens, certificates, or other data that allows the virtual assistant server 106, online user account server 136, and other servers within the server system 108 to locate and identify a device across the one or more networks 110. In some embodiments a smart home device 103, 133 can use the identifier token to establish a remote connection with the user device 104 if the user device is outside of the home or is not connected to the home network of the smart home devices. The smart home devices 103, 133 can use the identifier token to locate the user device 104 on a mobile wireless network and establish a secure remote companion link connection with the user device 104. Locating the user device 104 and establishing the connection to the user device can be facilitated in part via the virtual assistant server 106 and the online user account server 136. In such embodiments, at least a subset of the companion device functions of the user device 104 can continue to operate when the user device 104 is away from home, or if the user is at home but is not connected to the home network.

In some embodiments each virtual assistant client (VAC 101, VAC 102, VAC 131) executing on a device can be associated with a virtual assistant identifier. In various embodiments, the virtual assistant identifier can be associated with or derived from the identifier token for the host device, an account identifier associated with an online account of a user of the device, and/or another token associated with or derived from the account or device identifiers. The virtual assistant identifier of a virtual assistant client can uniquely or quasi-uniquely identify the VAC 101, 102, 131 on the various devices when the virtual assistant clients are communicating with each other or the virtual assistant server 106. The virtual assistant identifier can be associated with identification or location information of the host device of the virtual assistant, such as the identification token of the host device. After a paring relationship is created between a smart home device 103, 133 and the user device 104, the virtual assistant clients (VAC 101, VAC 131) on the smart home device can store the virtual assistant identifier and use the virtual assistant identifier to locate, identify, and communicate with the VAC 102 on the user device 104. The virtual assistant identifier for the VAC 102 can also be sent to the virtual assistant server 106 and stored as a companion virtual assistant identifier. Should the virtual assistant server 106 require access to private information of a user to perform processing operations for a request received at the VAC 101, 131 of the smart home device 103, 133, the virtual assistant server 106 can contact the VAC 102 of the user device 104 on behalf of the VAC 101, 131. The virtual assistant server 106 can then receive from the VAC 102 on the user device 104, in various embodiments, private information from the user device 104, processing results of an information processing task dispatched to the user device 104, or permission and/or access credentials to access private data on behalf of the user device 104.

In some embodiments, the server system 108 includes a relay server 126 that can be used to facilitate remote connections between a smart home device 103, 133 and the user device 104. The relay server 126 can enable a relay service that can relay companion link messages between devices in the event a local connection or another form of remote connection, such as a remote peer-to-peer connection, cannot be established. The relay server 126 can enable remote companion link message passing based on a relay pairing established between the smart home devices 103, 133 and the user device 104. Keys, certificate, and other identification and verification data associated with the various devices can be exchanged during the local pairing process that can be used to establish a relay pairing between devices. Once a relay pairing has been established between devices, the smart home devices 103, 133 can send messages to the relay server 126 with a unique relay identifier associated with the user device 104.

Each device that can connect with the relay server 126 can have an associated relay identifier, which is a persistent pairing token the can be used to identify and authenticate the connecting devices. The relay identifier can be, include, or be derived from a device identifier or identifier token that uniquely identifies the device and can include certificates and/or signatures that enable verification of the relay token.

The relay server 126 can then relay the messages to the user device 104. In one embodiment, a persistent and bidirectional connection can be established, enabling the user device 104 to send return messages to the smart home device 103, 133 via the relay server 126. In one embodiment, the user device 104 can also initiate a connection with a smart home device 103, 133 using a relay identifier associated with the device. In one embodiment, relay identifiers are used for each message exchanged over the relay server 126, enabling the relay server 126 to verify the authenticity of each message relayed though the server and to prevent unauthorized devices from transmitting messages via an established relay server connection.

Figure 2:
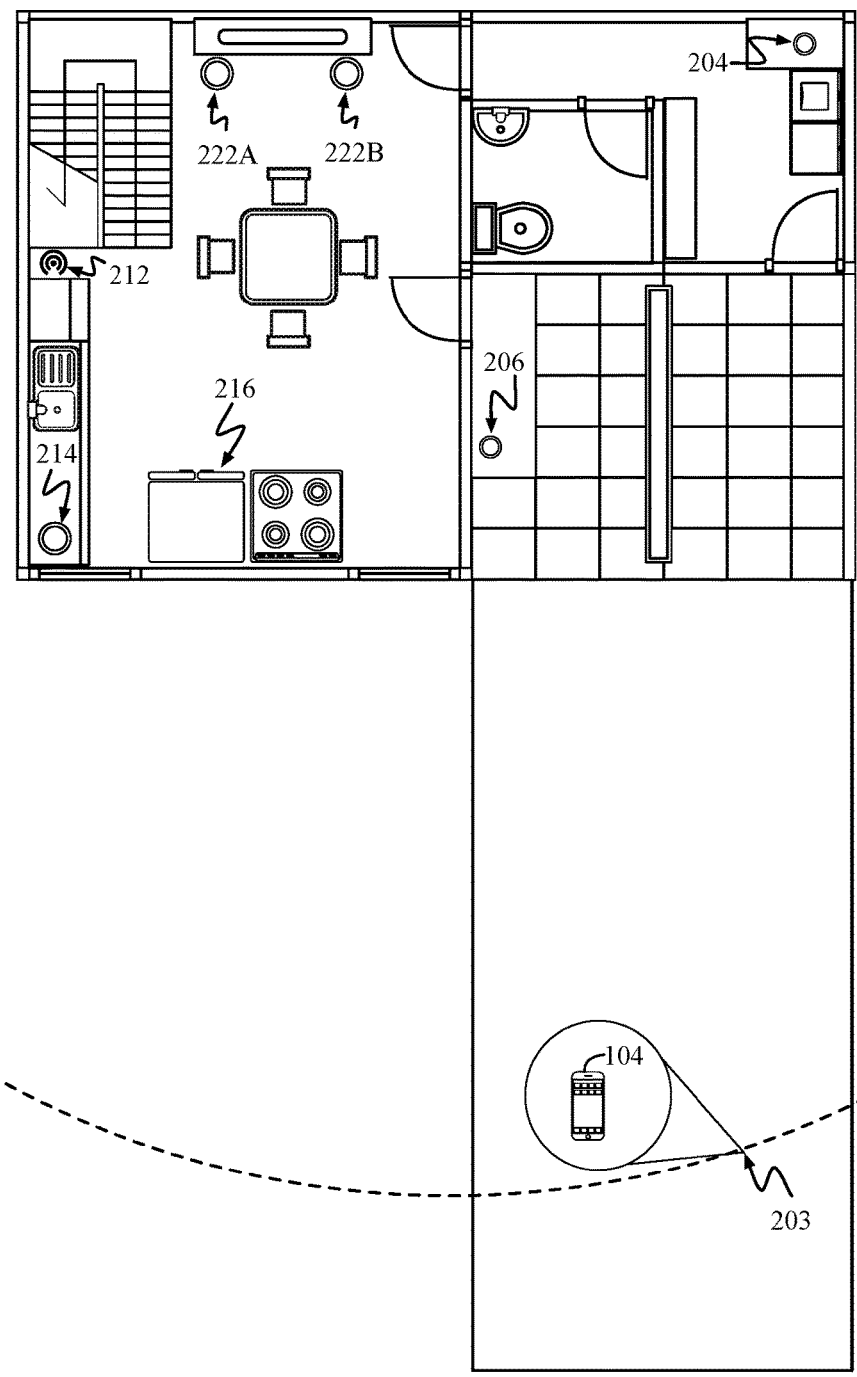
FIG. 2 illustrates a home network environment including multiple smart home devices, according to embodiments.

FIG. 2 illustrates a home network environment 200 including multiple smart home devices, according to embodiments. The home network environment 200 can include a wireless access point 212 to provide access to a wireless network that services the home network environment. The home network environment 200 can be part of a smart home environment. Multiple smart home devices 204, 206, 214, 216, 222A-222B can be connected to the home network environment 200 via the wireless network, or optionally a wired network connection. In various embodiments, the home network environment can include various types of smart home devices. For example, smart home device 204, 206, 214, can be smart speaker devices that are configured to distributed media playback. Additionally, smart home device 216 can be a smart appliance device, such as a smart refrigerator device. Each of the smart home devices 204, 206, 214, 216, 222A-222B can use the network of the home network environment 200 to establish interconnecting companion links to enable the devices to exchange configuration information. For example, smart home devices 222A-222B can be configured as multi-channel smart speaker devices, which can use the companion link to configure multi-channel (e.g., stereo, surround, etc.) audio playback. Additionally, each of the smart home devices 204, 206, 214, 216, 222A-222B can include virtual assistant clients which, in the event of a request that requires access to private user information, can interact with a designated companion device over a companion link to facilitate processing of the request. User devices such as a mobile instance of the user device 104 or a connected vehicle infotainment system, can also be configured to connect to the home network environment when in proximity to the wireless access point 212. In one embodiment the user device 104 can also create a companion link connection to any other user devices that may be connected to the home network environment 200 or within direct radio range of the user device 104.

Device and Companion Discovery

Before a companion link communication channel is established between a user device 104 and a smart home device 204, 206, 214, 216, 222A-222B, a companion discovery and pairing process is performed. The companion discovery process enables a smart home device to locate a companion device through which the virtual assistant client (e.g., VAC 101, 131 as in FIG. 1A-1B) on the smart home device is to access private user information that may be used to process and/or respond to a user request. The companion discovery process, in some instances, can also include user verification that communication between the smart home device and the companion device should occur. In some embodiments, companion discovery can leverage existing service discovery protocols that facilitate locating devices and/or services on a wireless or other network, such as the Simple Service Discovery Protocol (SSDP) developed by the UPnP Forum or the Bonjour networking technology developed by Apple Inc. (published as IETF RFC 6762 and IETF RFC 6763 and referred to herein as "Bonjour"). In a device discovery service, a device can advertise information indicating its existence, address, and optionally additional information about its capabilities. Other devices, including other smart home devices or user devices, can browse the advertisements and identify devices of interest based on the broadcast information. Using the advertised address, a browsing device can initiate communication with the advertiser.

Depending on the network and discovery service, advertising can optionally include real-time broadcasting of information (e.g., through a multicast or beacon signal) and/or providing advertisement information to a central repository (e.g., at a network access point) from which other devices can retrieve the information. Browsing of advertisements can include detecting broadcast advertisements and/or retrieving advertisement information from the central repository. In some embodiments, communal smart home devices that are stationary attached to a power source, such as an electrical outlet, can continuously perform advertisement and discovery for the companion link service. Mobile user devices can enable discovery of the companion link service based on the location of the user device. For example, and in one embodiment, a geo-fence boundary 203 is configured on the mobile device, such that companion link discovery is enabled when the mobile device is within a geographic proximity to a location designated as the home location of the user device 104.

When a communal smart home device is discovered by a user device acting as a companion device (e.g., user device 104), a network data connection (e.g., TCP, UDP, etc.) can be established between the communal smart home device and the companion device. The network data connection can be established using any network layer (e.g., layer 3) protocol. To avoid connection races between devices that are both advertising and discovering, the device with the lexicographically lower persistent identifier initiates the connection between devices. The persistent identifier of a device is derived from an anonymized identifier that is advertised via the discovery service. In one embodiment, to derive the persistent identifier based on advertised information make use of data exchanged via a previously performed pairing process. In such embodiment, a data connection cannot be established with a smart home device until the smart home device is paired with a user device, as the persistent identifier used to connect with a communal smart home device is otherwise unknown. Once a data connection is established, a secure communication session can be established between the communal smart home device and the companion device. The communal smart home device and the connected companion device can then exchange presence and reachability information. Where the companion device is a mobile device, the companion device can then enter a wake-on-wireless (WoW) state as needed, when data is not being exchanged over the companion link, while communal devices that are connected to a power source can remain active to reduce first-message latency.

In the event connectivity is lost between devices, the discovery service can be re-enabled and used to search for the device on the local network. If the missing device is re-discovered, the data connection between devices can be re-established. If the missing device cannot be discovered, state discovery service information in the records of the missing device is reconfirmed and cleaned. The searching device can then attempt to establish communication with the missing device via a secure internet session. In one embodiment, part of the presence and reachability information exchanged when establishing a data connection includes a device identifier, identifier token, relay identifier, or another form of identification token that can be used to reach or enable message exchange with the missing device, for example via a peer-to-peer or relayed Internet connection. If a secure Internet connection can be successfully established with the previously missing device, companion link messages can be exchanged over the secure Internet connection.

In the event a companion device is connected to a smart home device via an Internet-based connection and a local connection becomes available, the companion link connection can be switched to the local connection. For example, user device 104 can cross a geo-fence boundary 203 an enable a discovery protocol (e.g., SSDP, Bonjour, etc.) to search for devices (e.g., smart home devices 204, 206, 214, 216, 222A-222B). Should the user device 104 discover the availability of a local connection to the smart home device to which the user device 104 is connected to over the Internet connection, the user device can transition the Internet connection to a local (e.g., Wi-Fi) connection. In one embodiment, connection switching can be performed whenever connectivity is lost between connected devices (e.g., the user device 104 leaves the home network environment 200) or if the devices determine that a better connection is available (e.g., the user device 104 returns to the home network environment 200). Local connections can be preferred to Internet connections, as local connections presumably are lower latency. Additionally, it may be less resource intensive from a device and infrastructure standpoint to maintain a local connection instead of an Internet connection.

Figure 3:
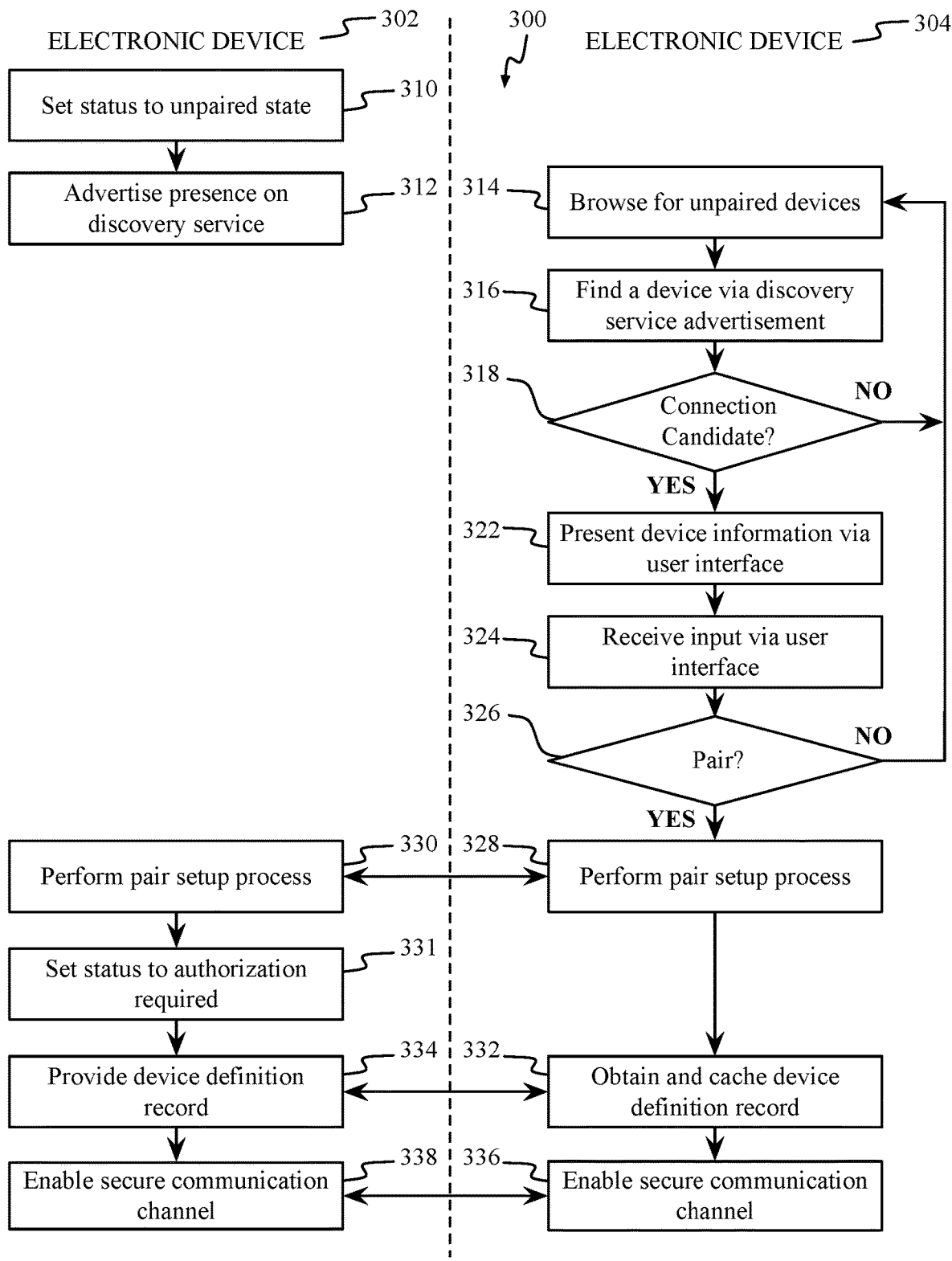
FIG. 3 is a flow diagram of operations of a discovery process used to discover and pair a communal device with a companion device, according to embodiments.

FIG. 3 is a flow diagram of operations of a discovery process 300 used to discover and pair electronic devices, according to embodiments described herein. The illustrated discovery process 300 includes operations performed on electronic device 302 and electronic device 304. Electronic device 302 and electronic device 304 can each be any smart home device described herein (e.g., smart home device 103, 133, as in FIG. 1, smart home device 204, 206, 214, 216, 222A-222B as in FIG. 2), or any personal user device described herein (e.g., user device 104), such as, but not limited to, a smartphone device, tablet computer device, or another user device that can connect with another device via a companion link described herein. For the purpose of illustrating the discovery process, electronic device 302 will act as a communal device, while electronic device 304 will act as a personal device or a companion device.

In one embodiment, as shown at block 310, electronic device 302 can set a status bit to indicate that the device is currently unpaired or is otherwise looking for a companion device with which to pair. The status bit can be a bit in a status flag indicator that listed in the status information advertised by electronic device 302. At block 312, electronic device 302 can advertise its presence via a discovery protocol (e.g., SSDP, Bonjour, etc.) as having support for the companion link service. For instance, using Bonjour, electronic device 302 can advertise itself with a name and a service type. The name can be a user-readable name for the companion discovery (e.g., "Speaker"); in some instances, the advertised name can be the name specified in the companion discovery information service instance of a device definition record. The service type can be defined for the uniform accessory protocol (e.g., service type "_companion-link._tcp"). The advertisement can also include additional information. Similar information can be distributed using other service discovery protocols and techniques. For instance, using SSDP, companion discovery can include advertising a name and service type URI using a multicast HTTP NOTIFY message. The URI can be used by the electronic device 304 to retrieve additional information via a unicast request to electronic device 302.

After electronic device 302 begins advertising the companion link service via a service discovery protocol, the electronic device 304 can discover the communal device when browsing for unpaired devices, as shown at block 314. No particular timing is required between the beginning of advertisement and the beginning of service browsing, although the electronic device 304 will be unable to discover electronic device 302 unless discovery advertisement is detectable when electronic device 304 browses.

In one embodiment, the electronic device 304 can browse for unpaired devices in response to a trigger, such as a trigger provided by an application execution on the electronic device 304. In one embodiment, the electronic device 304 can browse for unpaired devices when the electronic device 304 is placed in physical proximity to an unpaired device. For example, an out-of-box proximity setup for the communal device can include a data exchange over a short-range wireless communication mechanism (e.g., using Bluetooth and/or Bluetooth Low Energy, NFC, etc.), which can trigger the electronic device 304 to browse for unpaired devices.

At block 316, electronic device 304 can find a device via the discovery service advertisement, for example, by detecting the advertisement performed at block 312. At block 318, the electronic device 304 can determine, based on the advertisement, whether the discovered device is a connection candidate, such as the unpaired electronic device 302. In one embodiment, the electronic device 304 can determine the discovered device is a connection candidate when the discovered device is advertising the companion link service. The electronic device 304 can check the discovery status flags to determine whether electronic device 302 is already configured or paired with a companion device. As another example, the electronic device 304 can check the advertised protocol version to determine whether the companion link protocol version of electronic device 302 is compatible with the companion link protocol supported by electronic device 304. If electronic device 304 determines that the accessory is not advertising for a companion device with which to establish a companion link, electronic device 304 can return to block 314 and continue to browse. In one embodiment, after a period of time in which a communal device is not discovered, the browsing operations may timeout and browsing for unpaid devices may discontinue for a time.

At block 322, electronic device 304 can present information about electronic device 302 to the user via a user interface, such as a display device of electronic device 304. At block 324, electronic device 304 can receive input from the user via the user interface regarding actions to perform with the detected device. For example, the user can provide input indicating whether electronic device 304 should establish a pairing with the communal device. Electronic device 304 can present any or all of the information obtained from the advertisement data provided by the communal device and prompt the user to indicate whether electronic device 304 should connect to electronic device 302. Requesting user confirmation can help to avoid spurious or unwanted pairings between a communal device and a personal device. At block 326, electronic device 304 can interpret the user input received at block 324 and determine whether to pair with electronic device 302. In addition to user approval to initiate a pairing operation, other operations can be performed to complete the pairing operation to minimize risk of a pairing occurring without approval of the rightful owner/operator of electronic device 304. For example, electronic device 304 and/or electronic device 302 may request the input of a passcode known to the user of electronic device 304. In one embodiment, biometric verification (e.g., fingerprint, facial recognition, etc.) can be requested by electronic device 302 and/or electronic device 304 to complete the paring operation at block 326.

If the user directs electronic device 304 to decline the pairing or a user verification operation fails, electronic device 304 can return to block 314 to look for other accessories or devices. If electronic device 304 and electronic device 302 are to pair, at block 328 and block 330, electronic device 304 and electronic device 302 can respectively execute a pair setup process. In some embodiments, the pair setup process can be used to establish encryption keys to facilitate secure communication between electronic device 304 and electronic device 302. In some embodiments, user confirmation can be incorporated into the pair setup process, and a separate user confirmation prior to initiating pair setup is not required. In one embodiment, the pair setup process enables the establishment of a trusted relationship between electronic device 302 and electronic device 304. The established trust relationship can be later verified during setup of a secure communication session.

If the pair setup process completes successfully, at block 331 electronic device 302 can update device status information to indicate that authorization is now required to communicate with the accessory and/or that the accessory is now paired with at least one personal device, for example, by updating a status flag indicator within the advertised device data.

At block 332, electronic device 304 can obtain and cache a device definition record from electronic device 302, which can provide the record upon request at block 334. The device definition record can include a set of services supported by the device and/or other relevant characteristics that can enable other electronic device 304, as well as other connected devices, to determine how to control, connect with, or otherwise interact with electronic device 302. Where electronic device 304 caches the device definition record, the information can be used to facilitate detecting state changes in electronic device 302. In some embodiments, electronic device 304 can also cache information from the advertisement data provided by electronic device 302.

At blocks 336 and 338 electronic device 304 and electronic device 302 can begin to exchange data used to establish a secure communication channel. The data exchange can include a key or certificate exchange between the devices. The key exchange can be protected via a shared secret exchanged between devices, where the shared secret can be exchanged using an out-of-band communication method. Additionally, the data exchange can include the exchange of one or more long term keys between the devices, which may themselves be protected by one or more short-term keys. Once a pairing is established, the pairing can be leveraged to provide end-to-end message encryption such that only paired devices can read messages exchanged between the devices. In one embodiment, the secure communication channel is a bidirectional channel, enabling either device communicating not the channel to initiate a message exchange. During a message exchange, whichever device initiates the communication session is referred to as the client device, while the device accepting the session is referred to as the server device. In one embodiment, the first message exchanged between devices is an information exchange message. The client device can send an initial information message including feature flags or other device information. The server device can then respond with an information message as to supported features. Once the secure communication channel is established and the information exchange occurs, the communicating devices can enter an idle state if there are no immediate operations pending.

It will be appreciated that the discovery and pairing process described herein is illustrative and that variations and modifications are possible. Operations described as sequential may be executed in parallel, order of steps may be varied, and steps may be modified, combined, added or omitted. Furthermore, while the SSDP and Bonjour services are used as examples of a device discovery service, similar concepts can be applied in the context of other device discovery services. In some embodiments, prior to determining whether to pair with electronic device 302 or any other discovered device, the electronic device 304 can request a definition record (or a portion thereof) from the paring candidate device, which can be requested, for example, via an HTTP request). Depending on configuration, the paring candidate device can provide all, some, or none of its accessory definition record in response to a request from an unpaired electronic device. Alternatively, definition records may be accessible before a pairing is established and the decision whether to pair can be based on the advertisement information provided by the paring candidate device. The advertisement data can include, for example, a local name for the device; a unique accessory identifier; flags indicating that the accessory is discoverable; a universally unique identifier (UUID) for at least some of the services; an indicator of the device state; and an indication of whether the device has performed pair setup with any other electronic devices.

In some embodiments, the discovery process 300, or a similar process, can be used to detect state changes in paired devices. For example, a state number value that is advertised by a device can be incremented when device state changes. When a device (e.g., electronic device 302) advertises a state change, other paired devices (e.g., electronic device 304) can advertise the state change, for example, by broadcasting an updated Bonjour TXT record, and a paired electronic device that has previously cached the device record can detect the change by comparing the broadcast values of the state number with the cached value.

The secure communication channel established between the devices at block 336 and block 338 can be used to exchange companion link messages. In one embodiment, before companion link messages are exchanged over a companion link, a secure session is established or re-established between electronic device 302 and the electronic device 304. In one embodiment, establishing a session includes performing a pair-verify process to verify the pairing between devices. The pair-verify process relies upon a previously established paring relationship between electronic device 302 and electronic device 304. For example, and in one embodiment, establishing a companion link session between devices can require the persistent identifier of the devices, which can be derived from an anonymized identifier that is advertised via the discovery service. However, to derive the persistent identifier based on the advertised information can make use of one or more elements of data that were exchanged during the pairing process between the devices. In one embodiment, the pair-verify process can include the generation of short-term public key pairs that are used to encrypt or sign messages exchanged during the verification process, as well as a verification of previously exchanged long-term key pairs that were exchanged during the initial pairing of the devices. The pair-verify process can be performed each time a secure session is established between devices using a companion link connection.

Figure 4:
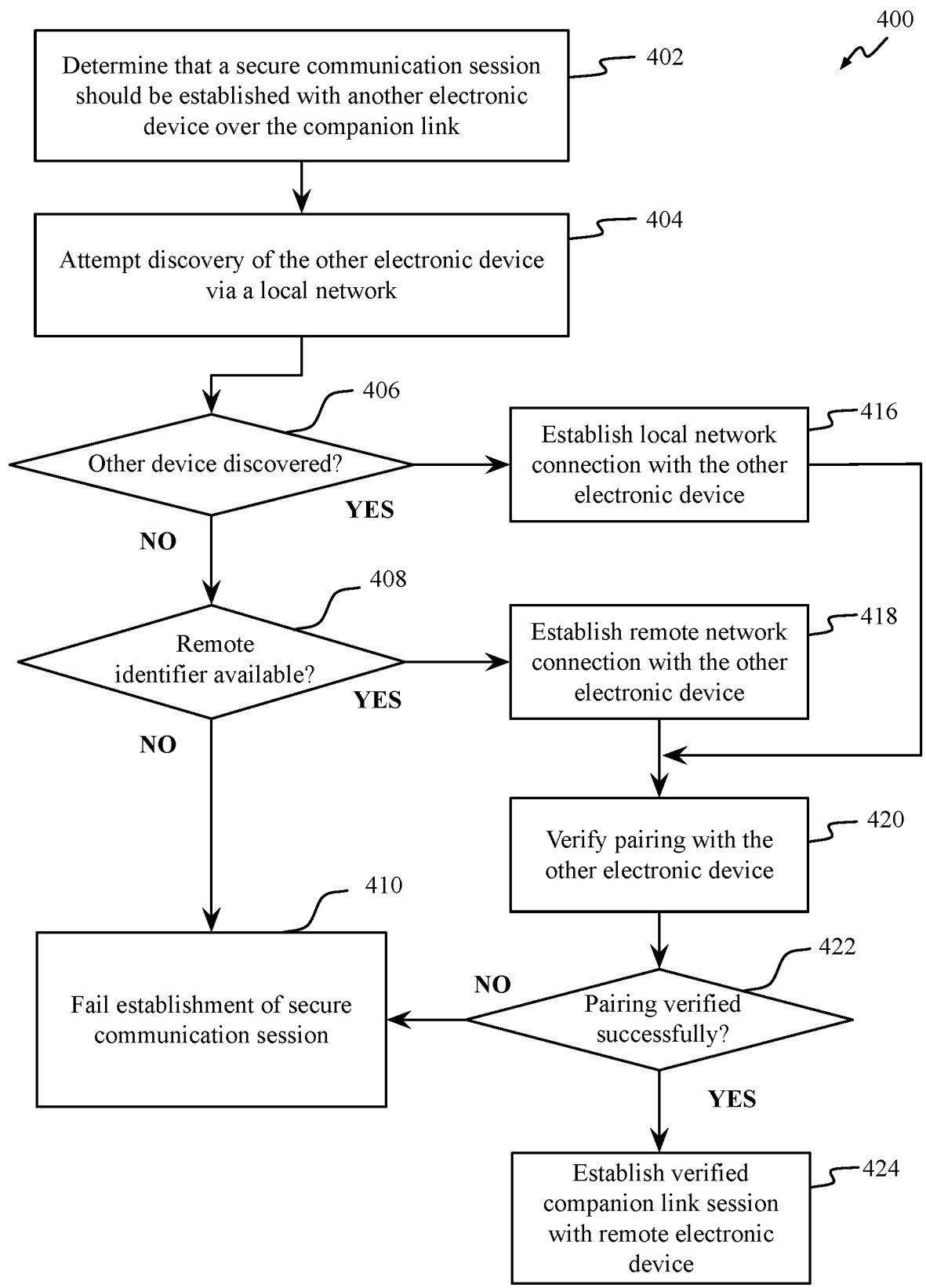
FIG. 4 illustrates a process for establishing a companion link connection with a paired device, according to embodiments described herein.

FIG. 4 illustrates a process 400 for an electronic device to establish a companion link connection with a paired device, according to embodiments described herein. The process 400 illustrates operations in which an electronic device is to initiate a connection with another electronic device over the companion link. In one embodiment, during message exchange over the companion link, whichever device initiates the communication session is a client device with respect to the companion link, while the device accepting the session is a server device with respect to the companion link, accordingly, any electronic device that can connect over the companion link may each initiate or accept a companion link connection.

At block 402, a determination can be made at a client electronic device that a communication session should be established with another electronic device (e.g., server electronic device) over the companion link. The determination can be made by any companion-link capable electronic device described herein to initiate a data transmission session between devices. The connection can be established at device initialization on a client device, to re-establish a connection that has been disconnected, or a connection that has timed-out due to non-use.

At block 404, the client electronic device can attempt discovery of the other electronic device via the local network. The discovery can be performed using a discovery service as described herein, including but not limited to Bonjour or SSDP. If the other device is discovered locally at block 406, the process 400 continues at block 416, where the client electronic device can attempt to establish a local network connection with the other electronic device. The local network connection can be established via a network protocol such as, but not limited to, the transmission control protocol (TCP). If the other electronic device is not discovered locally, the client electronic device can determine if a remote identifier is available at block 408. The remote identifier can be an identifier or identification token that enables the electronic device, or another companion link client, to locate, connect, and established a companion link session with a paired device that does not reside on the same network or is otherwise unable to be discovered via a discovery service protocol. One or more remote identifiers can be exchanged between companion link devices during the presence and reachability information exchange that occurs during a local device discovery and/or pairing process (e.g., discovery process 300 as in FIG. 3). Exemplary remote identifiers include the virtual assistant identifier associated with a virtual assistant client on the other electronic device, which can be used to communicate via a virtual assistant server (e.g., virtual assistant server 106 as in FIG. 1B); an identifier token established via registration with an online user account server (e.g., online account server 136 as in FIG. 1B); and a relay identifier associated with a relay server (e.g., relay server 126 as in FIG. 1B). The electronic device can use an available remote identifier to query for a network address, such as an Internet IP address, that can be used to connect to the other electronic device, or to enable a relayed message exchange with the other electronic device via a relay service. At block 418, the electronic device can use a remote identifier to establish a remote network connection with the other electronic device.

Whether the connection is established via a local network connection at block 416 or a remote network connection at block 418, the client electronic device can verify the pairing with the other electronic device at block 420. Verifying the pairing establishes that a genuine pair relationship exists between the devices commenting over the companion link and makes uses of data exchanged during a previous local pairing. In one embodiment, a pair-verify process is performed in which each device demonstrates possession of a long-term private key corresponding to a long-term public key that was exchanged during pair setup. The pair-verification process can additionally include establishing a new shared secret or session key, which can be used to encrypt communications that occur during a pair-verified session.

At block 422 the other electronic device can determine whether the pair-verify process was successful. If the pair verification process at block 420 fails to verify a pair relationship between the electronic devices, the client electronic device will fail the establishment of the secure communication session, as the security of the communication link may have been compromised. In one embodiment, the client electronic device can inform the user of when a secure connection with another electronic device has failed to validate.

If at block 422 the electronic device determines that the pairing has been successfully verified, the client electronic device can establish a verified companion link session with the companion device to the virtual assistant client on the electronic device to service queries that access private data for the user of the companion device at block 424. The verified session can enable end-to-end encrypted message exchange between the devices, such that messages and data can be exchanged between devices in a privacy-preserving manner. The encrypted message exchange can be performed to enable, for example, the relay of commands or responses for a virtual assistant with respect to personal or private user data, synchronize device data between the electronic devices, or establish a secure intercom media stream with the other electronic device.

As indicated above, while process 400 is described and illustrated with a client electronic device initiating a connection with another (e.g., server) electronic device, a verified companion link session is a bidirectional connection once established, enabling two-way message exchange between the devices. Furthermore, any mobile devices that participate in the session can enter a wake-on-wireless state when data is not being exchanged over the companion link, such that the device may enter a low power state while the wireless radio and associated processors maintain the connection associated with the session.

Media Intercom over Companion Link

Figure 5A:
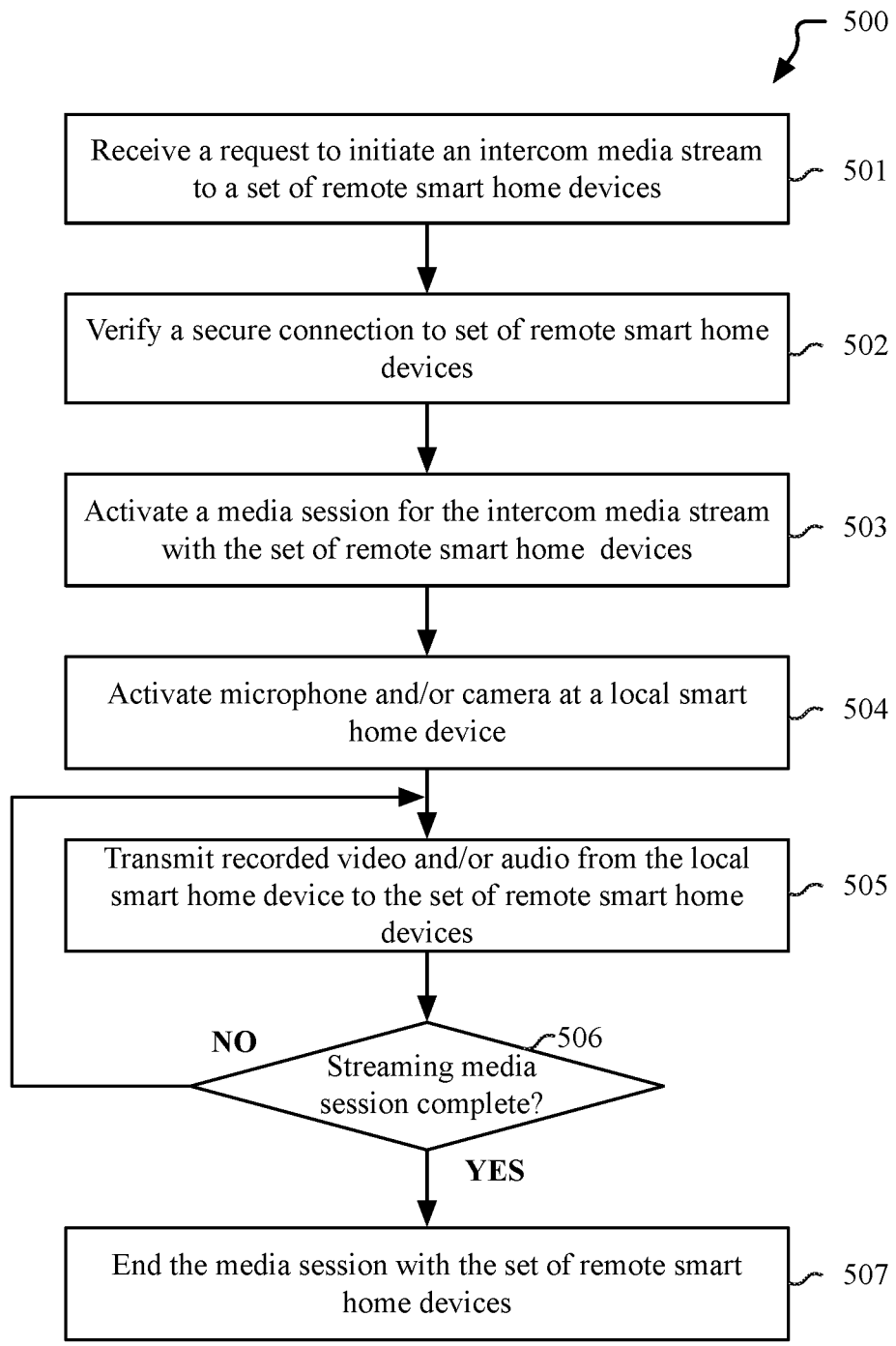
FIGS. 5A-5B illustrate methods to initiate intercom media streaming from a smart home device.
Figure 5B:
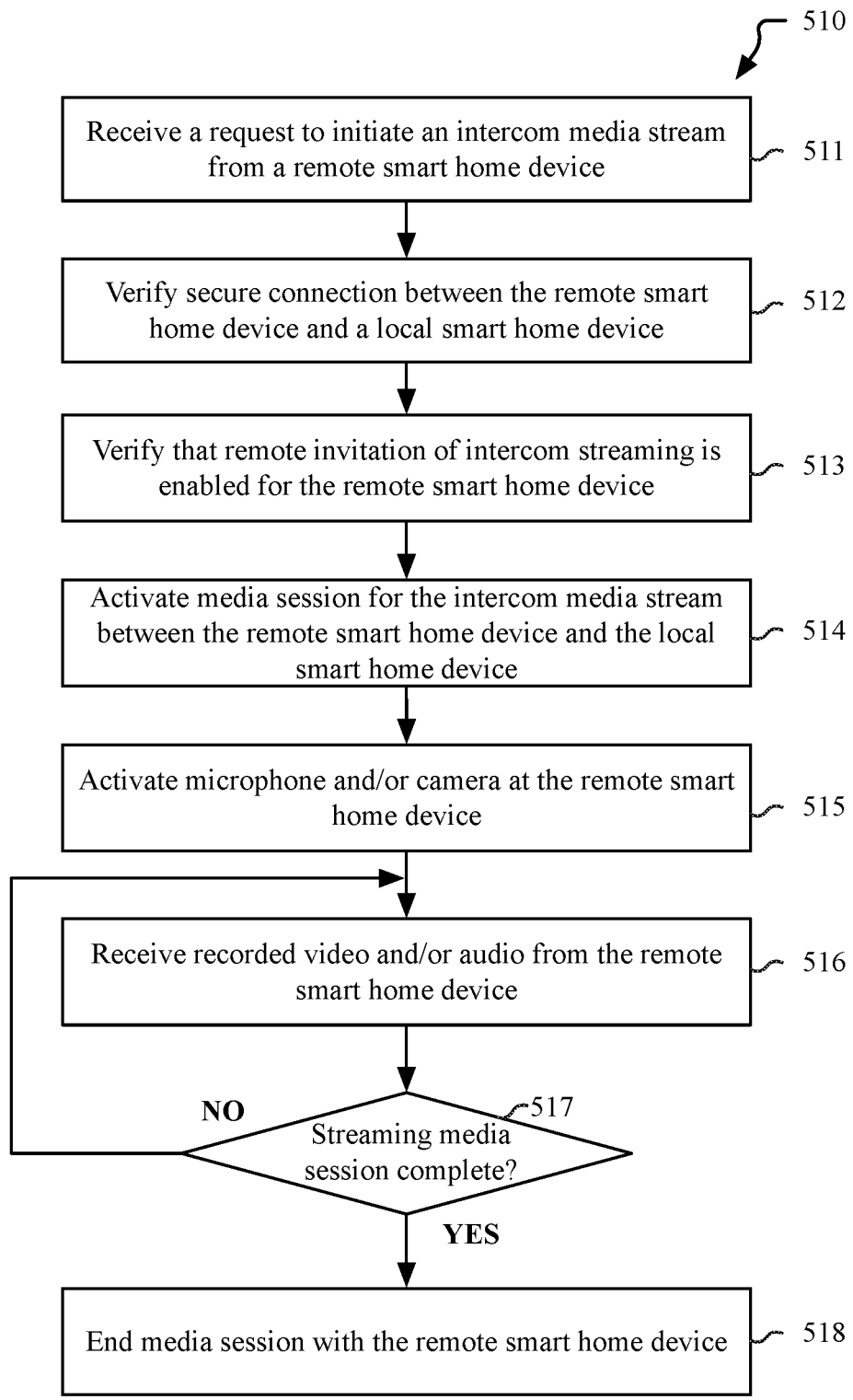

FIGS. 5A-5B illustrate methods to initiate intercom media streaming from a smart home device. FIG. 5A illustrates a method 500 to stream media from a local smart home device to a remote set of smart home devices, according to an embodiment. FIG. 5B illustrates a method 510 to initiate streaming from a remote smart home device to a local smart home device, according to embodiments. The smart home devices can be, for example, a smart speaker device, a smart home appliance, or another type of smart home device or intelligent electronic appliance (e.g., thermostat, refrigerator, etc.) as described herein. A local smart home device refers to a device that is proximate to an initiating user, while a remote smart home device refers to a device that is in a different location, such as a different room within a home or within a different home that is linked with the home of the initiating user.

As shown in FIG. 5A, method 500 includes for a smart home device, such as a local smart home device, to receive a request to initiate an intercom media stream to a set of smart home devices (block 501). The set of smart home devices can be remote smart home devices that are in a different location than the local smart home device and the initiating user. The request to initiate the media stream can be received in response to a touch input, text input, voice input, or another form of input, such as a physical button press. The input can be provided to the local smart home device or another electronic device that is connected to the smart home device. The voice input can be received and processed via a virtual assistant system as described herein. The request to initiate the media stream can specify the destination of the media stream and the type of media to stream. In one embodiment the source of the media stream can be determined based on the location of the user that is issuing the command. In one embodiment the source of the media stream can be explicitly stated by the user.

For example, a user can provide a voice command "Let me speak to the kitchen," and hardware, firmware, and/or software logic on the local smart home device that is proximate to the user can receive the request. In one embodiment the voice input can be received and processed by a virtual assistant system as described herein. The request may be interpreted as a request to open a media (e.g., audio) stream from the local smart home device to a smart home device that has been specified as being located in the kitchen of a home. Alternatively, an electronic device of the user, such as a wearable electronic device or a mobile electronic device, can receive the voice command and relay the command, or an associated request based on the command, to a local smart home device. In one embodiment an application on a mobile electronic device, wearable electronic device, or smart home device can be used to initiate the streaming request. The user can provide a command via the application via a voice, touch, or text input, and the command will be interpreted as a request to initiate an audio and/or video stream from a specified local device to a specified destination.

Once a request is received that indicates or implies a type of media stream and a destination for the media stream, method 500 includes for the initiating device to verify a secure connection to the specified set of smart home devices (block 502). Verification of the secure connection can include the verification of a previously established pairing relationship, for example, via the pair-verify process described herein. The secure connection is an authenticated encrypted network connection such as a companion link connection as described herein. Method 500 then includes for the local smart home device to activate a media session for the intercom media stream with one or more smart home devices in the specified set of smart home devices for which a secure session can be verified (block 503). Method 500 further includes for the local smart home device to activate a microphone and/or camera at a local smart home device (block 504). If there are multiple smart home devices that are local to the initiator, one of the multiple smart home devices can be selected. For example, the closest smart home device can be selected or, for video streams, the closest smart home device with a camera can be selected. Alternatively, if a local source device is specified in the request received at block 501, a microphone and/or camera of the specified local source device can be used to capture media for the media stream.

Method 500 additionally includes operations to perform a live media stream loop in which a block of recorded video and/or audio from the local smart home device is transmitted to the set of smart home devices (block 505). The block of recorded video and/or audio can be a buffer of live or substantially live (e.g., slightly delayed) media data that is recorded contemporaneously with transmission to the set of remote smart home devices. The live recording and transmission can continue until method 500 determines that the streaming media session is complete (block 506). Method 500 can then end the media session with the set of smart home devices (block 507). Method 500 can determine that the streaming media session is complete at block 506 based on a command received from the initiator to end the media session, or via receipt of a touch input, physical button press, or another indicator to end the media session.

In addition to streaming media from a local smart home device to one or more remote smart home devices, a user can initiate a media stream from a remote smart home device to a local smart home device if remote streaming is enabled for the remote smart home device. Remote initiation of streaming can be enabled or disabled in the settings of a given smart home device.

As shown in FIG. 5B, method 510 includes to receive a request to initiate an intercom media stream from a smart home device, which can be a remote smart home device (block 511). The request can be relayed to the remote smart home device from a local smart home device. The request can be generated based on a command provided to a local smart home device, mobile electronic device or wearable device associated with an initiating user. The command can be a voice or text command or can be based on a touch input or a physical button. For example, an initiating user can provide a voice command such as "Let me listen to the baby's room," which can be interpreted as a request to initiate audio streaming from a smart home device in a location designated as the "baby's room." The audio can be streamed to a smart home device that is proximate to the initiating user or, in one embodiment, a smart home device that is designated by the initiating user. In one embodiment the initiating user can provide a voice command such as "Let me see the baby's room" and if a camera-enabled smart home device is in the location designated as the "baby's room," a video stream (which may also include audio) can be enabled. In one embodiment the voice commands can be processed by a virtual assistant system as described herein, which can generate the appropriate requests.

Once a request is received that indicates a type of media stream and a source for the media stream, and in one embodiment a destination for the media stream, method 510 includes for the initiating device to verify a secure connection between the remote smart home device and a local smart home device that will receive the media stream (block 512). Verification of the secure connection can include the verification of a previously established pairing relationship, for example, via the pair-verify process described herein. The secure connection is an authenticated encrypted network connection such as a companion link connection as described herein. Method 510 additionally includes to verify that remote initiation of intercom steaming is enabled for the remote smart home device (block 513). Remote initiation of streaming can be enabled or disabled in the settings of a given smart home device, and a remote media streaming session will not be established if remote initiation of streaming is disabled.

Method 510 additionally includes for the local smart home device to activate a media session for the intercom media stream between the remote smart home device and the local smart home device (block 514). When the media session is activated, the remote smart home device can activate a microphone and/or camera (block 515). A live media stream loop can then be performed in which a block of recorded video and/or audio transmitted from the remote smart home device is received at the local smart home device (block 516). The block of recorded video and/or audio can be a data buffer of live or substantially live media data that was recorded contemporaneously with the transmission of the data buffer to the local smart home device. The live recording and transmission can continue until the local smart media device determines that the streaming media session is complete (block 517). Method 510 additionally includes for the local smart media device to end the media session with the set of smart home devices (block 518). The local smart media device can determine that the streaming media session is complete at block 517 based on a command received from the initiator to end the media session, or via receipt of a touch input, physical button press, or another indicator to end the media session.

Computing Device for a Smart Home Device

Figure 6:
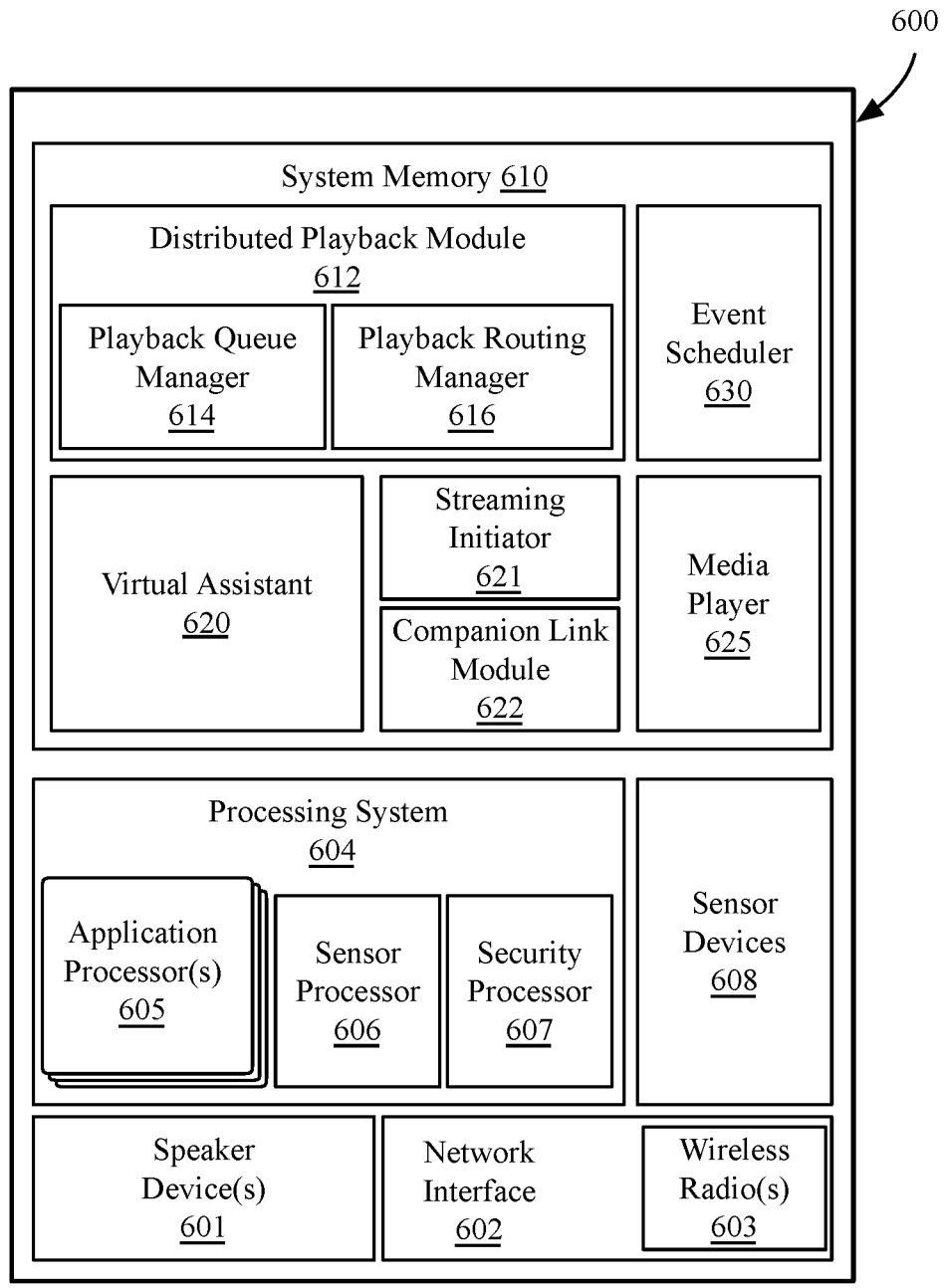
FIG. 6 is a block diagram of a computing device for use within a smart home device, according to an embodiment.

FIG. 6 is a block diagram of a computing device 600 for use a smart home device, according to an embodiment. The computing device 600 includes one or more speaker device(s) 601 to enable media playback. Where the computing device 600 is implemented as a smart speaker device, the speaker device(s) 601 may be of higher quality relative to when the computing device is implemented as a user device or a smart appliance.

The computing device 600 includes a network interface 602 that enables network communication functionality. The network interface 602 can couple with one or more wireless radio(s) 603 to enable wireless communication over one or more wireless networking technologies such as, but not limited to Wi-Fi and Bluetooth. In some implementations, the network interface 602 may also support a wired network connection. The computing device also includes a processing system 604 having multiple processor devices, as well as a system memory 610, which can be a virtual memory system having an address space that includes volatile and non-volatile memory.

In one embodiment, the processing system 604 includes one or more application processor(s) 605 to execute instructions for user and system applications that execute on the computing device 600. The processing system can also include a sensor processor to process and monitor a suite of sensor devices 608 having sensors including, but not limited to motion sensors, light sensors, proximity sensors, biometric sensors, audio sensors (e.g., microphones), and image sensors (e.g., cameras). The sensor processor 606 can enable low-power monitoring of always-on sensors within the suite of sensor devices 608. The sensor processor 606 can allow the application processor(s) 605 to remain in a low power state when the computing device 600 is not in active use while allowing the computing device 600 to remain accessible via voice or gesture input to a virtual assistant 620. In one embodiment, the sensor processor 606 or a similar low power processor within the processing system can enable low power processing of media instructions provided by a media player 625. The media player 625 may be a modular media player that is capable of playback of a variety of different audio and/or video media types, including but not limited to MPEG-2, MPEG-4, H.264, and H.265/HEVC. In one embodiment, other formats may be supported via additional CODEC plugins. The computing device can optionally include a display device (not shown) or can output video to other devices for display using a wireless display protocol.

The virtual assistant 620 is the logic that executes on the computing device 600 to provide the intelligent automated assistant system described herein. The virtual assistant 620 can be selectively given access to various software and hardware components within the computing device, including but not limited to the network interface 602 to retrieve data via a network, media playback applications to initiate or stop playback of media files, or user calendar data to schedule calendar events, tasks, reminders, or alarms. Where the virtual assistant 620 executes on a smart home device as described herein, the virtual assistant can interact with a companion link module 622 to locate and connect with a companion device or a virtual assistant executing on the companion device in the event a request is received to access personal domain data of a user. The virtual assistant 620 can also interact with a streaming initiator 621 to initiate media streaming to and from the computing device 600, as shown in FIG. 5A-5B.

Where the computing device 600 is within a smart speaker device capable of participating in a distributed playback system, a distributed playback module 612 can perform operations to manage various aspects of media playback, including but not limited to a playback queue manager 614 to manage a list of media to be played via a distributed playback system and a playback routing manager 616 to route media playback to specific elements of the distributed playback system. In one embodiment the playback routing manager 616 can connect with different elements of the distributed playback system via a connection established using the companion link module 622. The companion link module 622 can facilitate connection establishment and message relay over a companion link established between the speakers and devices of the distributed playback system to perform operations such as configuring channel output for a multi-channel playback system or coordinating volume adjustments across multiple connected speakers. In one embodiment the companion link module 622 can also perform operations to enable a media intercom over the companion link connection between the computing device 600 and other smart home devices.

In one embodiment, the event scheduler 630 can exchange data with the distributed playback module 612. The data exchange can be performed in response to input received via a user interface of the computing device 600 or a different computing device that participates within the distributed playback system. The data exchange can also be performed in response to activity requested via the virtual assistant 620. For example, and in one embodiment, an event scheduled via the event scheduler 630 can be associated with a media playlist, such that upon occurrence of the scheduled event, a playlist can be played via the playback queue manager 614. For example, an alarm can be scheduled to wake a user at a specific time. The alarm can be associated with a playlist, such that one or more media elements will be played in association with or as a replacement for an alarm sound. In one embodiment, a playlist can be associated with any event scheduled via the event scheduler 630, including reminder or timer expiration events.

In one embodiment, the playback queue manager 614 can manage multiple simultaneous playback queues, where the playback queues include one or more past, present or future media elements to be played via the computing device 600. The playback queues can be loaded with individual media elements or playlists that specify multiple media elements. The playback queues can include locally stored media, media that will be retrieved for playback via a media server or media that will be streamed from a local or remote media streaming server. Multiple types of media elements may be played over the distributed playback system via the playback queue manager, including multimedia files such, as but not limited to music, music videos, and podcasts, including audio or video podcasts, or audio and/or video clips of current news, weather, or sports events.

Where one or more podcasts are selected for playback in response to the occurrence of a scheduled event, podcast selection logic can select a specific episode of a podcast for playback, such as the latest available episode of a podcast or the latest available unplayed podcast. Such selection can be determined from explicit user preferences or based on learned user preference information. The selection can also be performed based on the age of the available unplayed podcasts relative to the current date. In one embodiment, a podcast feed contains metadata that indicates whether the podcast feed is associated with a serial podcast or a news-style podcast. Whether to play the earliest unplayed episode or the latest episode can be determined at least in part based on such metadata.

In one embodiment, for example when setting a wake alarm, a news program or news channel may be selected for playback. The user may select a specific program or channel for playback in response to the wake alarm. Alternatively, the user can select a generic news category and logic associated with the playback queue manager 614 can select the news program or news channel to play based on selected user preferences. In one embodiment, a news program preference can be determined based on news topic preferences selected in a news program on a user device.

In one embodiment, the playback routing manager 616 can be used to select a playback device within the distributed playback system to use to play a playback queue. Depending on the number of playback devices within the distributed playback system, multiple different queues can be active on multiple different playback devices or multiple different playback devices within the distributed playback system can be grouped. Grouped playback devices can share a common playback queue and simultaneously play the same media. When a smart playback device is provisioned, the playback device can be associated with one or more users and/or one or more user accounts. The smart playback device can also be assigned a location and/or device type. In one embodiment, residential distributed playback network can be configured in which multiple user devices and play media via one or more smart playback devices within a residence. When a smart playback device is added to the residential network, a room or location of each playback device can be specified. An ownership can also be specified for each smart playback device that indicates whether the smart playback device is associated with a single user or if the smart playback device is a smart home device that is associated with multiple users.

As described above, one aspect of the present technology is the gathering and use of data available from specific and legitimate sources for use with a virtual assistant, as described herein. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to allow a user to access calendar or reminder data via a virtual assistant. Allowing the virtual assistant to access contact data can enable the virtual assistant to send messages or initiate telephone calls. Further, other uses for personal information data that benefit the user are also contemplated by the present disclosure. For instance, health and fitness data may be used, in accordance with the user's preferences to provide insights into their general wellness or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of smart home devices having access to personal data, the present technology can be configured to allow users to select to "opt in" or "opt out" of participation in the collection of personal information data during registration for services or anytime thereafter. In another example, users can select not to enable access to certain elements of personal or private data from a smart home device. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user' s privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, some smart-home device functionality can be enabled based on aggregated non-personal information data or a bare minimum amount of personal information, such as the content being handled only on the user' s device or other non-personal information that may be available.

Exemplary Application Programming Interface Architecture

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

Figure 7:
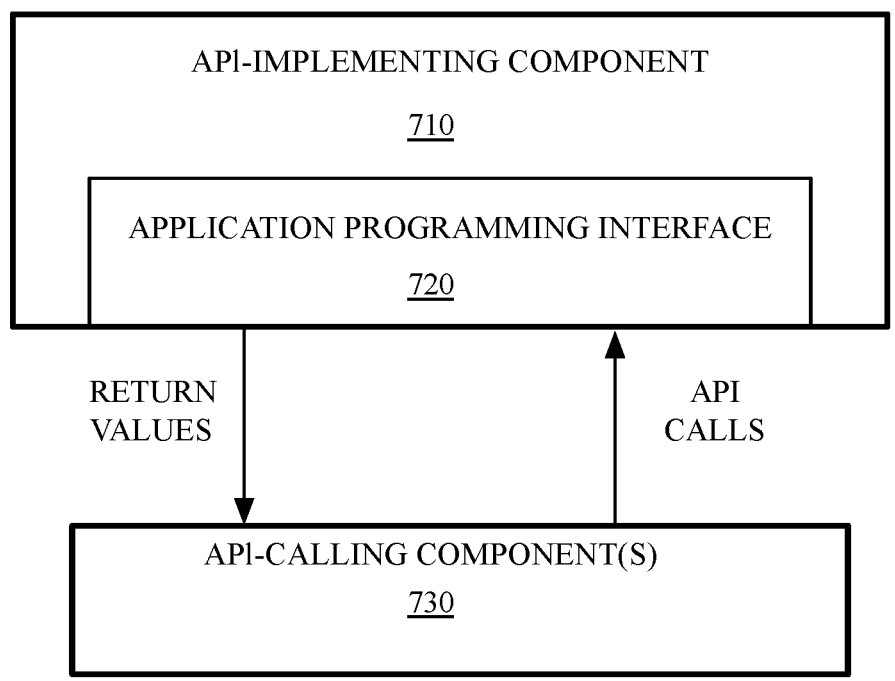
FIG. 7 is a block diagram illustrating an exemplary API architecture, which may be used in some embodiments of the invention.

FIG. 7 is a block diagram illustrating an API architecture 700, which may be used in some embodiments of the invention. The API architecture 700 includes the API-implementing component 710 (e.g., an operating system, a library, a device driver, an API, an application program, software or other module) that implements the API 720. The API 720 specifies one or more functions, methods, classes, objects, protocols, data structures, formats and/or other features of the API-implementing component that may be used by the API-calling component 730. The API 720 can specify at least one calling convention that specifies how a function in the API-implementing component receives parameters from the API-calling component and how the function returns a result to the API-calling component. The API-calling component 730 (e.g., an operating system, a library, a device driver, an API, an application program, software or other module), makes API calls through the API 720 to access and use the features of the API-implementing component 710 that are specified by the API 720. The API-implementing component 710 may return a value through the API 720 to the API-calling component 730 in response to an API call.

It will be appreciated that the API-implementing component 710 may include additional functions, methods, classes, data structures, and/or other features that are not specified through the API 720 and are not available to the API-calling component 730. It should be understood that the API-calling component 730 may be on the same system as the API-implementing component 710 or may be located remotely and accesses the API-implementing component 710 using the API 720 over a network. While FIG. 7 illustrates a single API-calling component 730 interacting with the API 720, it should be understood that other API-calling components, which may be written in different languages (or the same language) than the API-calling component 730, may use the API 720.

The API-implementing component 710, the API 720, and the API-calling component 730 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 8A:
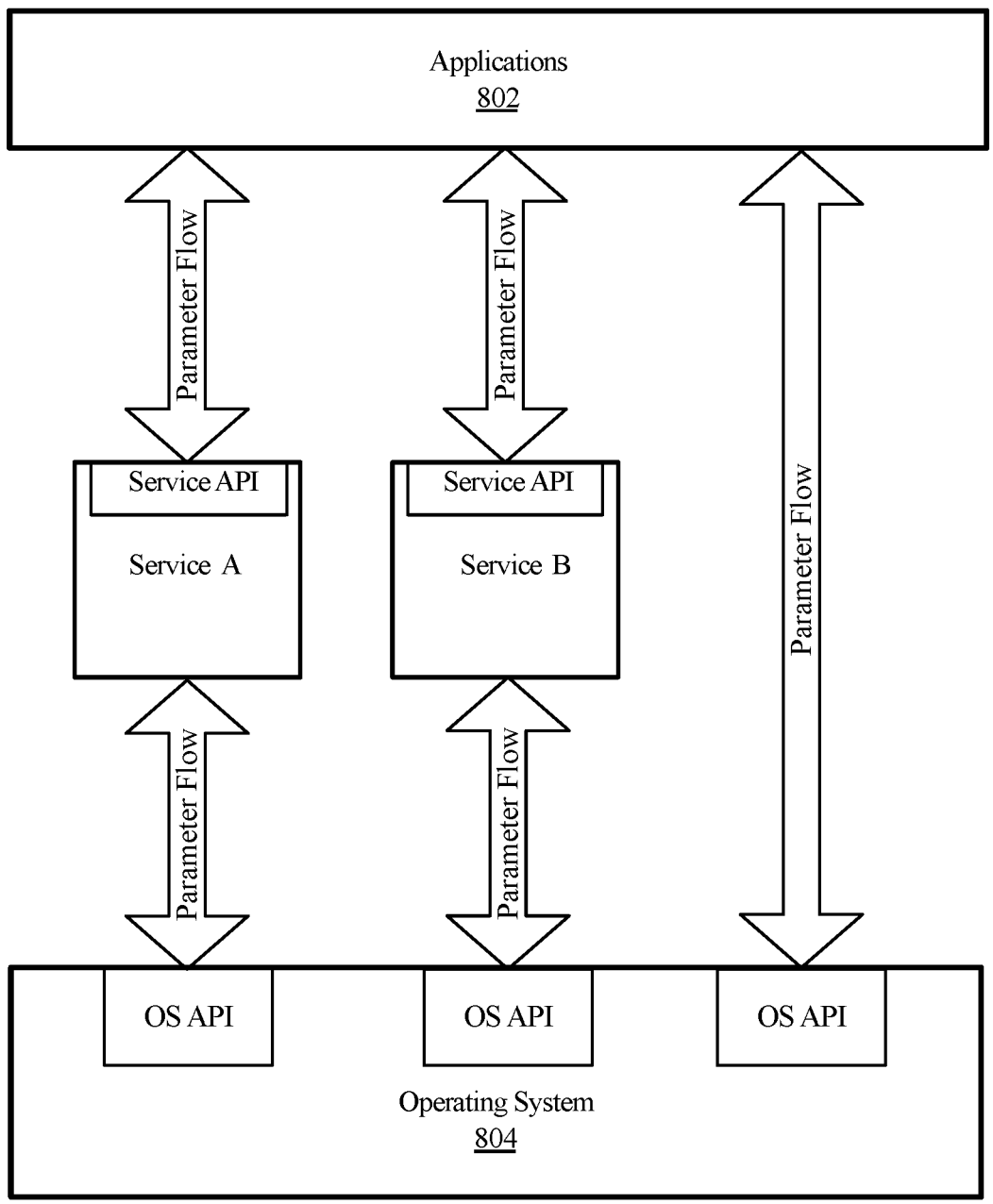
FIGS. 8A-8B are block diagrams of exemplary API software stacks, according to embodiments.
Figure 8B:
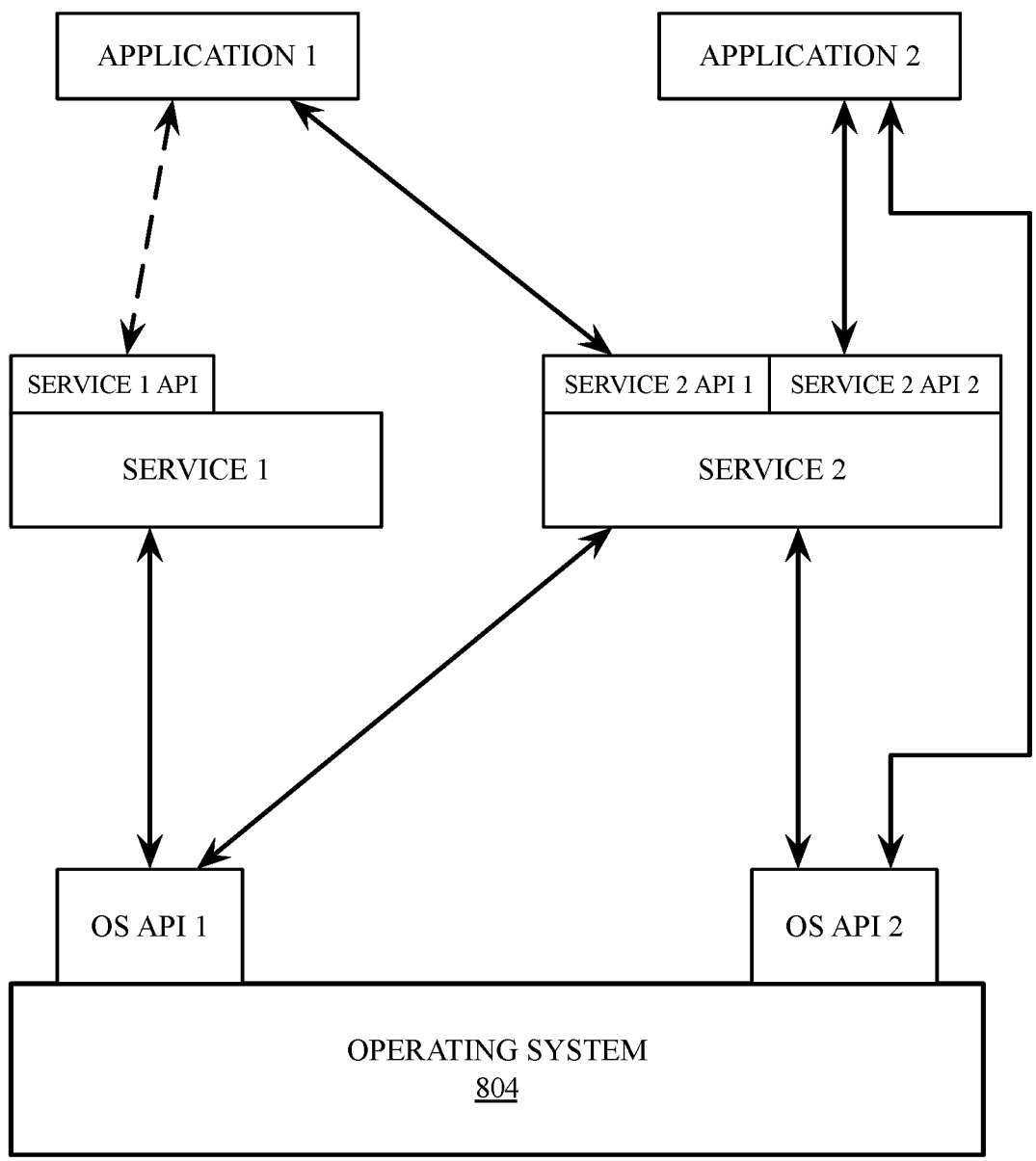

FIGS. 8A-8B are block diagrams of exemplary API software stacks 800, 810, according to embodiments. FIG. 8A shows an exemplary API software stack 800 in which applications 802 can make calls to Service A or Service B using Service API and to Operating System 804 using an OS API. Additionally, Service A and Service B can make calls to Operating System 804 using several OS APIs.

FIG. 8B shows an exemplary API software stack 810 including Application 1, Application 2, Service 1, Service 2, and Operating System 804. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

API for Intercom Media Streaming

Figure 9A:
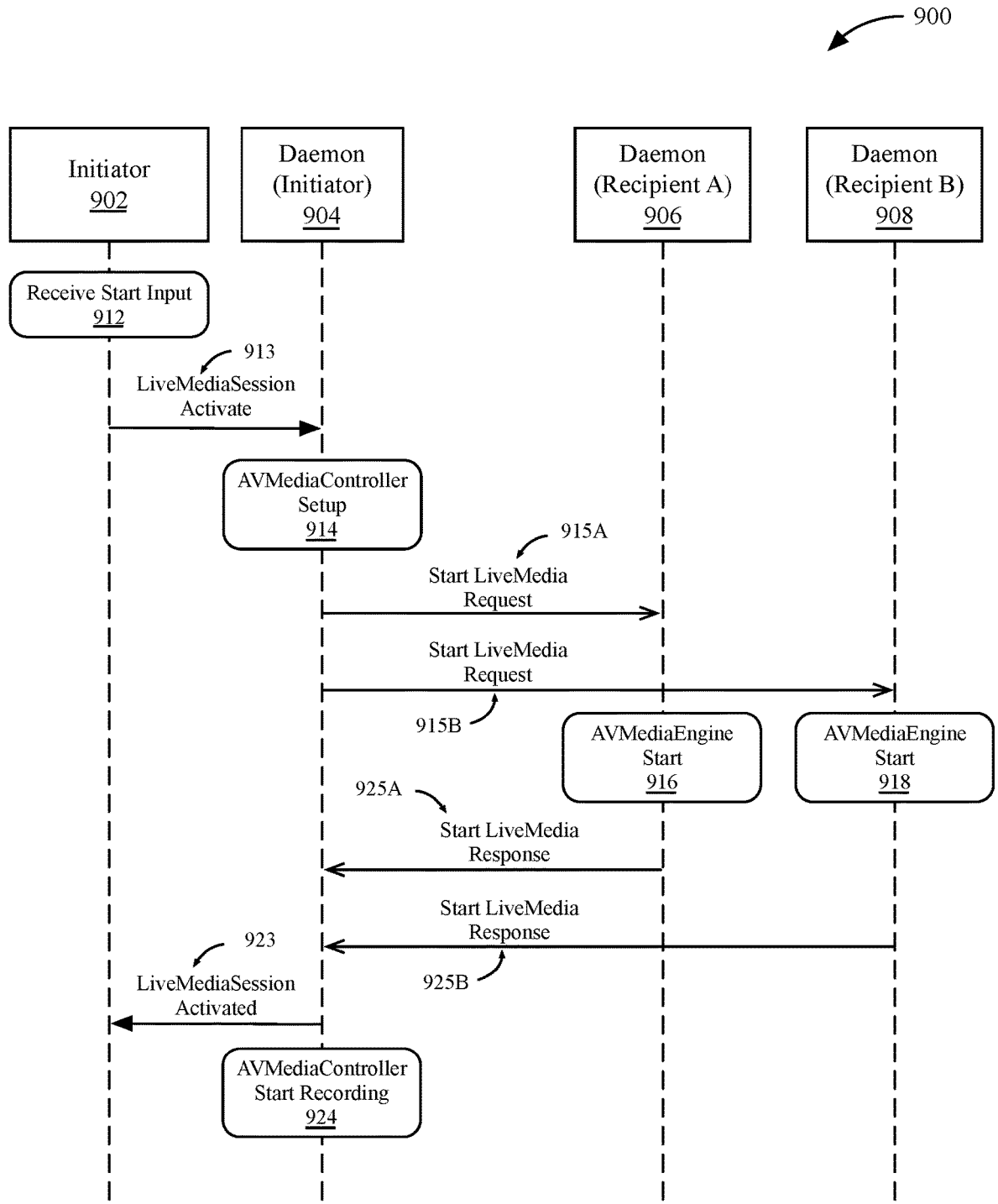
FIGS. 9A-9C illustrate sequence diagrams for an API that enables intercom media streaming between smart home devices.
Figure 9B:
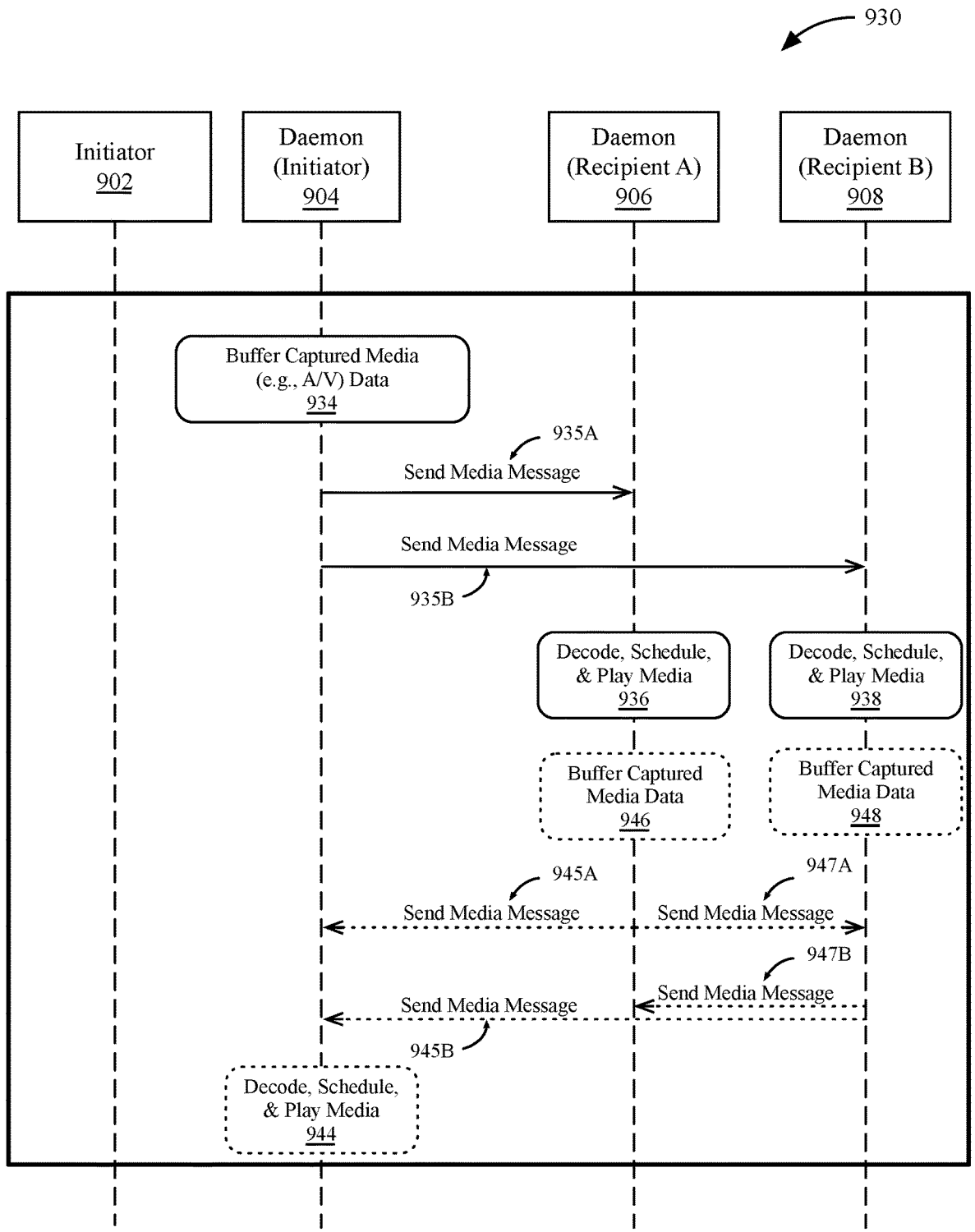
Figure 9C:
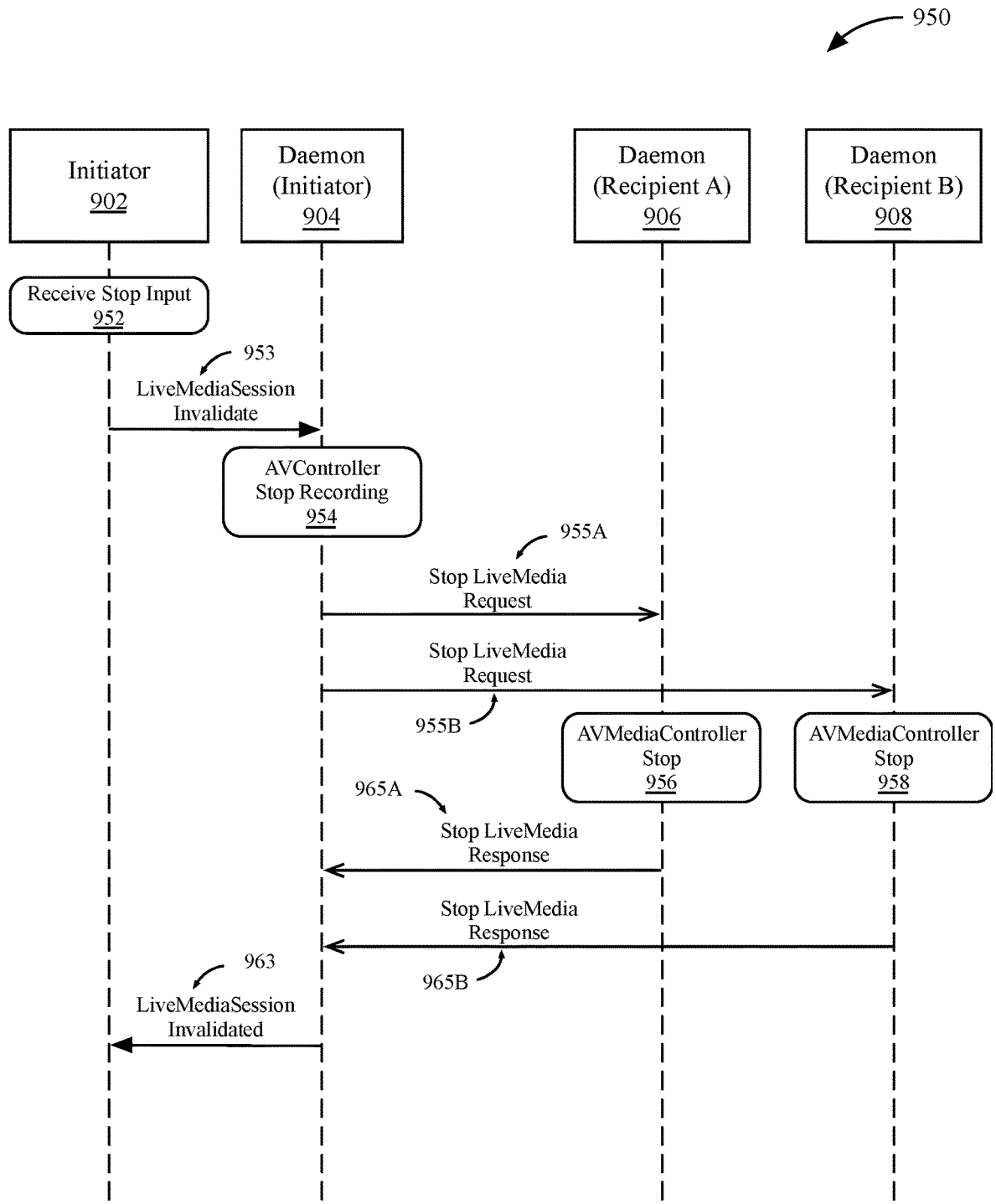

FIGS. 9A-9C illustrate sequence diagrams for an API that enables intercom media streaming between smart home devices. The illustrated sequences and components represent implementations of method 500 shown in FIG. 5A. FIG. 9A illustrates an API sequence 900 to initiate streaming from a local smart home device (or another electronic device) to multiple recipient smart home devices, according to an embodiment. FIG. 9B illustrates an API sequence 930 for a live media recording, transmission, and playback loop, according to an embodiment. FIG. 9C illustrates an API sequence 950 to terminate a live media streaming session, according to an embodiment. The illustrated API sequences feature an initiator 902, a daemon 904 associated with the initiator 902, and a daemon associated with each recipient device (e.g., daemon 906 of recipient A, daemon 908 of recipient B).

In one embodiment, the initiator 902 is a software application that executes on a processor of a smart home device, or another electronic device. In one embodiment the initiator 902 is a firmware module that executes on a microcontroller of a smart home device. The initiator 902 can also be a hardware module on a smart home device that is connected to a touch input device or a physical device, such as a physical button or switch. In one embodiment the initiator 902 is a component of the streaming initiator 621 of the electronic device 600 shown in FIG. 6. In some embodiments, daemon 904, daemon 906, and daemon 908 are each software modules associated with an operating system of an electronic device, such as a smart home device. In one embodiment, the daemons are the companion link daemons that manage companion link sessions on each of the initiator and recipient devices. For example, each daemon can be, or can be a component of the companion link module 622 of the computing device 600 shown in FIG. 6.

As shown in FIG. 9A, the initiator 902 can receive a start input 912, which can be based on a voice input, text input, touch input, or another type of input, such as a physical button or switch. The voice input can be facilitated via a virtual assistant system as described herein. The start input causes a live media session activate message 913 to be sent to or received by the daemon 904 associated with the initiator 902. Where the initiator 902 is a hardware or firmware module, the initiator can detect the start input 912 and trigger an electrical signal that causes an interrupt associated with the live media session activate message 913. Where the initiator 902 is a software module, an inter-process communication API provided by an operating system or framework can be used to send the live media session activate message 913 to the daemon 904. The daemon 904 can trigger an AV media controller setup operation 914 in response to receipt of the live media session activate message 913. The AV media controller setup operation 914 can include various sub-operations to configure a media (e.g., audio/video) controller on the electronic device associated with the daemon 904 to prepare to record media, such as audio and/or video. The daemon 904 can also send a start live media request messages 915A-915B over a secure network connection (e.g., the companion link) established with multiple recipients. Daemon 906 on recipient A can receive start live media request message 915A, while daemon 908 on recipient B can receive start live media request message 915B. In response to receiving the start live media request messages, daemon 906 and daemon 908 can perform respective AV media engine start operation 916 and operation 918, which each configure media engines of the respective devices to accept an incoming audio and/or video stream. Daemon 906 and daemon 908 can then each send respective start live media response messages 925A-925B to daemon 904. Daemon 904 can then send a live media session activated message 923 to the initiator 902 and trigger an AV media controller start recording operation 924. A recording and transmission loop can then commence in which the initiator streams media including audio and/or video data to the recipients.

As shown in FIG. 9B, a media recording, transmission, and playback loop can occur in which daemon 904 on the initiator device performs operations 934 to buffer captured media (e.g., audio and/or video) data. Daemon 904 then sends media message 935A to daemon 906 on recipient A and media message 935B to daemon 908 on recipient B. Recipient A performs a decode, schedule, and play media operation 936, while recipient B performs a similar decode, schedule, and play media operation 938. Daemon 906 and daemon 908 can decode, schedule and play received media by sending messages to other software, hardware, and firmware modules on the electronic devices to facilitate the decoding, scheduling, and playing of the media. The manner in which received media messages are decoded, scheduled, and played can vary depending on the recipient, as the recipient A and recipient B may be different types of smart home devices. For example, recipient A may be a smart speaker device, while recipient B may be a smart appliance device. Additionally, one or both of the recipients may include a display device, while other types of smart home devices may lack a display or include a low-resolution display.

While some embodiments may enable only a one-way media stream, at least one embodiment enables a two-way media steam. For a two-way media stream, one or both of recipient A and recipient B can record live audio and/or video using microphones and/or cameras on the recipient devices. Daemon 906 can perform an operation 946 to buffer captured media data, while daemon 908 can perform an additional operation 948 to buffer captured media data. The daemons of the recipients can perform operations 945A-945B to send media messages to daemon 904, which can perform an operation 944 to decode, schedule, and play media received from the recipients, for example, by using an internal API provided by the device associated with the initiator 902. In one embodiment the daemons of the recipients can also perform operations 947A-947B to exchange media messages with each other, which can be immediately decoded, scheduled, and played, or can be decoded, scheduled, and played during play media operation 936 and play media operation 938 during the next loop cycle.

As shown in FIG. 9C, a live media session can be terminated when the initiator receives a stop input 952, which can be any type of input described herein. In response to receipt of the stop input, the initiator 902 can send a live media session invalidate message 953 to daemon 904, which causes the daemon 904 to perform operations to invalidate and terminate the media session. Such operations include for the daemon 904 to perform an AV controller stop recording operation 954, which causes the media controller on the initiator smart home device to cease recording operations at a microphone and/or camera. Daemon 904 can then send stop live media request message 955A and stop live media request message 955B respectively to daemon 906 on recipient A and daemon 908 on recipient B. Daemon 906 and daemon 908 can perform an AV media controller stop operation 956. Daemon 908 can perform a similar AV media controller stop operation 958, which can include similar or different sub-operations as the AV media controller stop operation 956 performed by daemon 906. Daemon 906 and daemon 908 can then send stop live media response messages 965A-965B to daemon 904 in acknowledgement of stop live media request messages 955A-955B. Daemon 904 can then send a live media session invalidated message 963 to the initiator 902 to inform the initiator that the live media session has been invalidated and terminated, which ends media streaming between the initiator and the recipients.

Figure 10A:
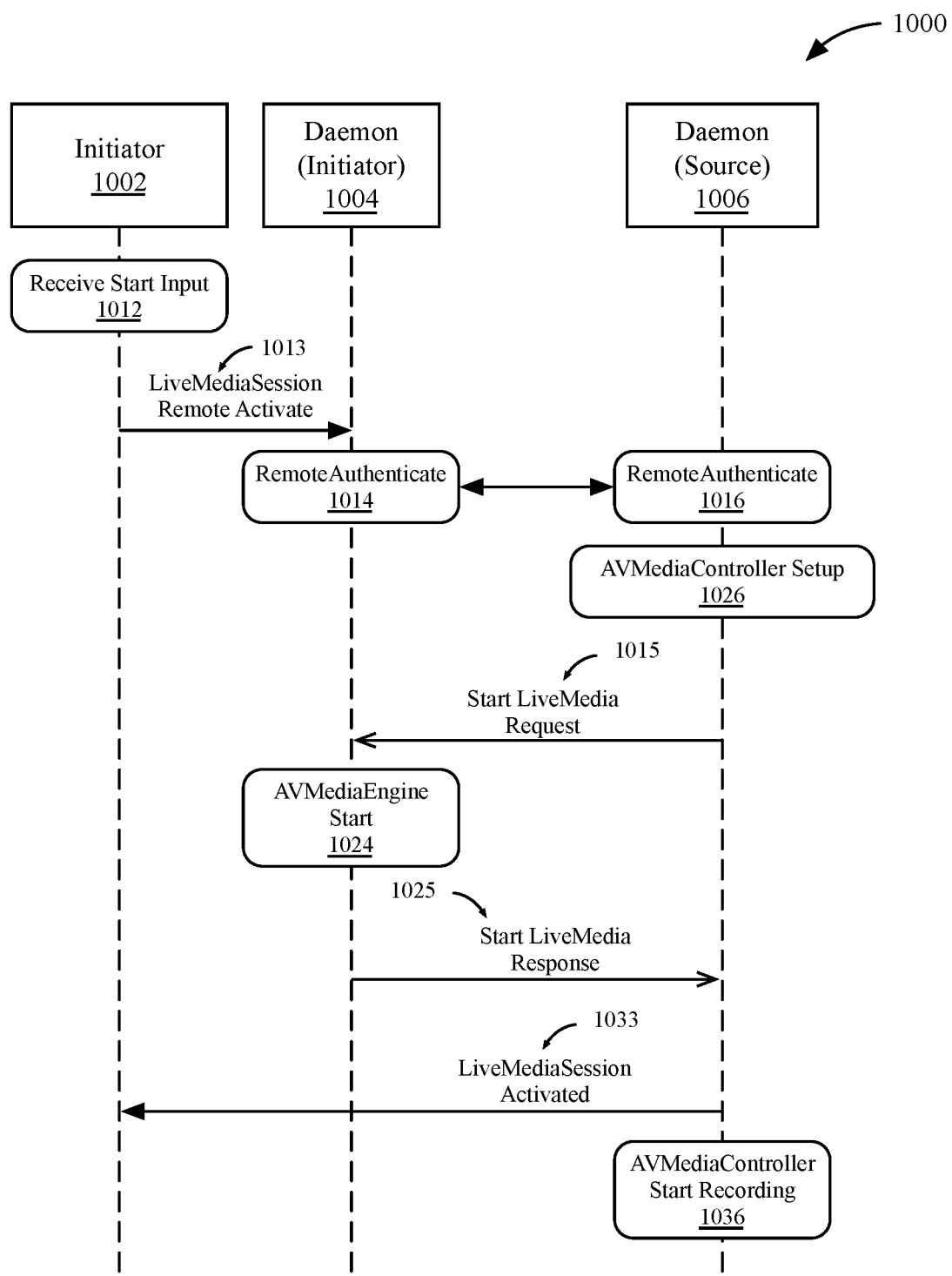
FIGS. 10A-10C illustrate sequence diagrams for an API to stream intercom media from a remote smart home device.
Figure 10B:
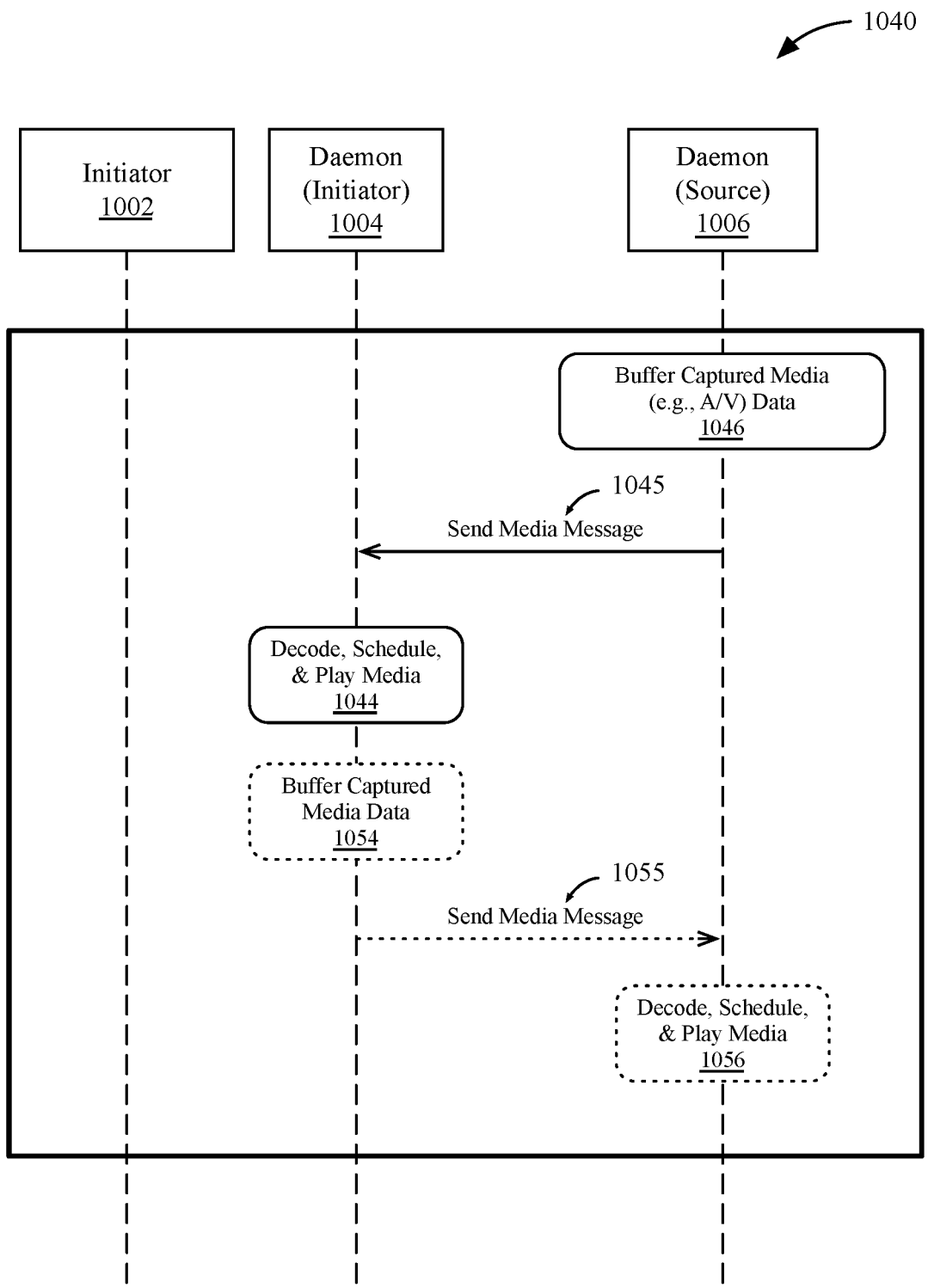
Figure 10C:
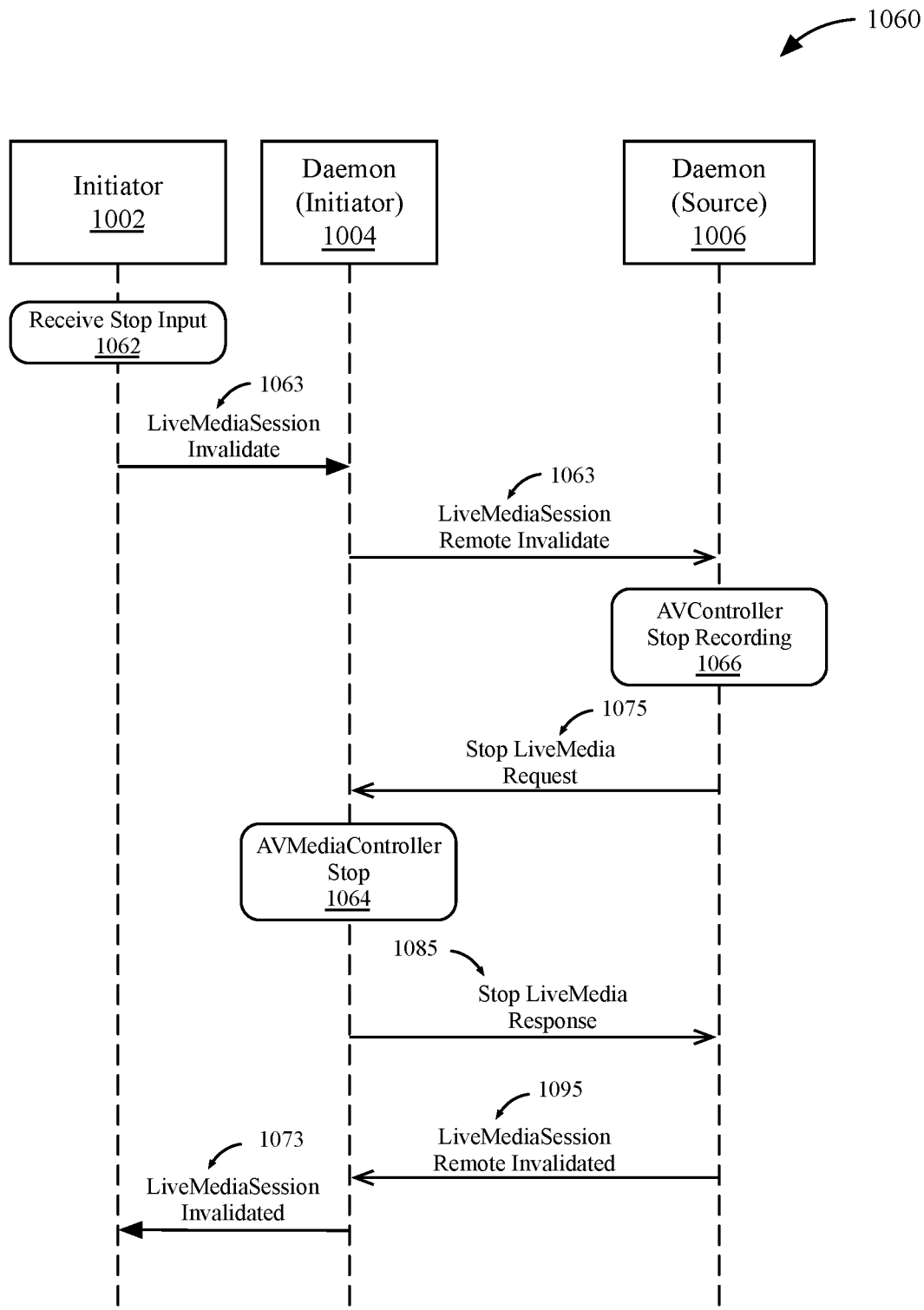

FIGS. 10A-10C illustrate sequence diagrams for an API to stream media from a remote smart home device. The illustrated sequences and components represent implementations of method 510 shown in FIG. 5B. FIG. 10A illustrates an API sequence 1000 to initiate streaming to a local smart home device (or another electronic device) from a source smart home device, according to an embodiment. FIG. 10B illustrates an API sequence 1040 for a live media recording, transmission, and playback loop, according to an embodiment. FIG. 10C illustrates an API sequence 1060 to terminate a live media streaming session with a remote source, according to an embodiment. The illustrated API sequences feature an initiator 1002, a daemon 1004 associated with the initiator 1002, and a daemon 1006 associated with a remote source device. In one embodiment the sequences and components are similar to those of FIGS. 9A-9C, excepting that the API of FIGS. 10A-10C enable an initiator to initiate streaming from a remote smart home device if remote initiation of streaming is enabled for that device. For example, the initiator 1002 can be, or can be included within the streaming initiator 621 of the computing device 600 of FIG. 6. Daemon 1004 and daemon 1006 can be, or can be included within, the companion link module 622 of the computing device 600 of FIG. 6.

As shown in FIG. 10A, the initiator 1002 can receive a start input 1012. In response to receipt of the start input 1012, the initiator 1002 can send a live media session remote activate message 1013 to a daemon 1004 associated with the initiator 1002. The daemon 1004 can perform a remote authenticate operation 1014 over a companion link connection with a daemon 1006 associated with a remote smart home device, which will be the source of the remotely initiated media stream. Daemon 1006 on the remote smart home device can also perform a remote authenticate operation 1016, which verifies to daemon 1004 that remote initiation of a media stream is enabled for the remote smart home device that will be the source of the remote media stream. Remote authenticate operation 1016 and remote authentication operation 1014 can also verify that the smart home device (or other electronic device) of the initiator is authorized to initiate a remote media stream. The remote authenticate operations can also verify that the initiating smart home device is associated with a user account that is authorized to initiate a remote media stream.

If remote initiation of a media stream is enabled for the remote smart home device that is to be the source of the media stream, daemon 1006 can perform an AV media controller setup operation 1026 and send a start live media request message 1015 to daemon 1004. Daemon 1004 can then perform an AV media engine start operation 1024 and send a start live media response message 1025 to daemon 1006. Daemon 1006 can reply to the start live media response message 1025 by sending a live media session activated message 1022 to the initiator 1002 to indicate that the live media session has begun. Daemon 1006 can then perform an AV media controller start recording operation 1036 to begin recording audio and/or video for transmission to the smart home device associated with the initiator 1002.

As shown in FIG. 10B, a media recording, transmission, and playback loop can occur in which daemon 1006 on the remote source device performs operations 1046 to buffer captured media (e.g., audio and/or video) data. Daemon 1006 then sends media message 1045 to daemon 1004 on the initiator device. Daemon 1004 can then perform a decode, schedule, and play media operation 1044 using an internal API provided by the system on which the daemon 1004 and/or the initiator 1002 executes. The manner in which received media messages are decoded, scheduled, and played can vary depending on the specific device that is associated with the initiator 1002 and/or the daemon 1004, as such device can be, for example, a smart speaker device, a smart appliance device, or another type of smart home device. In one embodiment, a two-way stream may be alternately enabled in which daemon 1004 associated with the initiator device can perform a buffer captured media data 1054 operation and send a media message 1055 to daemon 1006 of the source device. Daemon 1006 can then perform a decode, schedule and play media operation 1056.

As shown in FIG. 10C, a live media session can be terminated when the initiator receives a stop input 1062, which can be any type of input described herein. In response to receipt of the stop input, the initiator 1002 can send a live media session invalidate message 1063 to daemon 1004. Daemon 1004 can then send a live media session remote invalidate message 1063 to daemon 1006 on the remote smart home device that is the source of the remote media stream. Daemon 1006 can then perform an AV controller stop recording operation 1066, which stops the recording operations for a microphone and/or camera on the remote source. Daemon 1006 can then send a stop live media request message 1075 to daemon 1004. The stop live media request message 1075 can cause daemon 1004 to perform an AV media controller stop operation 1064 which causes the AV media controller on the initiator to stop the processes responsible for decoding, scheduling, and playing the incoming media stream. Daemon 1004 then responds to daemon 1006 over the companion link with a stop live media response message 1085, which acknowledges to daemon 1006 that the initiator has performed operations in response to the stop live media request message 1075. Daemon 1006 can then send a live media session remote invalidated message 1095 to daemon 1004. Daemon 1004 can then inform the initiator 1002 via a live media session invalidated message 1073, which informs the initiator that the remote live media session has been invalidated and terminated.

In addition to the live media streams described above, in one embodiment a "send as virtual assistant" feature is provided in which messages can be send to a remote device to be spoken in the voice of a virtual assistant that executes on or is otherwise associated with the remote device. A user can issue a voice command to a virtual assistant on a local smart home device to speak a message at a remote smart home device. The local smart home device can perform a speech to text operation on the input message and transmit text of the input message over a companion link to the remote smart home device. The remote smart home device can then perform a text to speech operation on the received message text. For example, a user can issue a command to a local smart home device, such as, "Let me speak a message to the kid's room." The virtual assistant on a local smart home device can reply with, "OK. What would you like to say?" The user can reply with "Come to the kitchen, dinner will be ready soon." The audio data of the message can be translated to text data and transmitted to a smart home device in the location designated as "kid's room." The smart home device in the kid's room can then speak a message, "<User> says, 'Come to the kitchen, dinner will be ready soon.'" <User> can be the name of the sending user or another designated moniker, such as, for example, but not limited to "Mom," "Dad," "Grandma," "Grampa," etc. The selected moniker can be pre-defined by a user. The virtual assistant can select the moniker to use based on detecting of a relationship between a sending user account and a user account associated with the destination smart home device. If the same user accounts are used by the source and destination smart home devices or a relationship between the sender and recipient of the message cannot otherwise be determined, the virtual assistant can omit the "<User> says" portion of the message, or can speak the source of the message, such as, for example, "Come to the kitchen, dinner will be ready soon," or "The kitchen says, 'Come to the kitchen, dinner will be ready soon.'"

Figure 11:
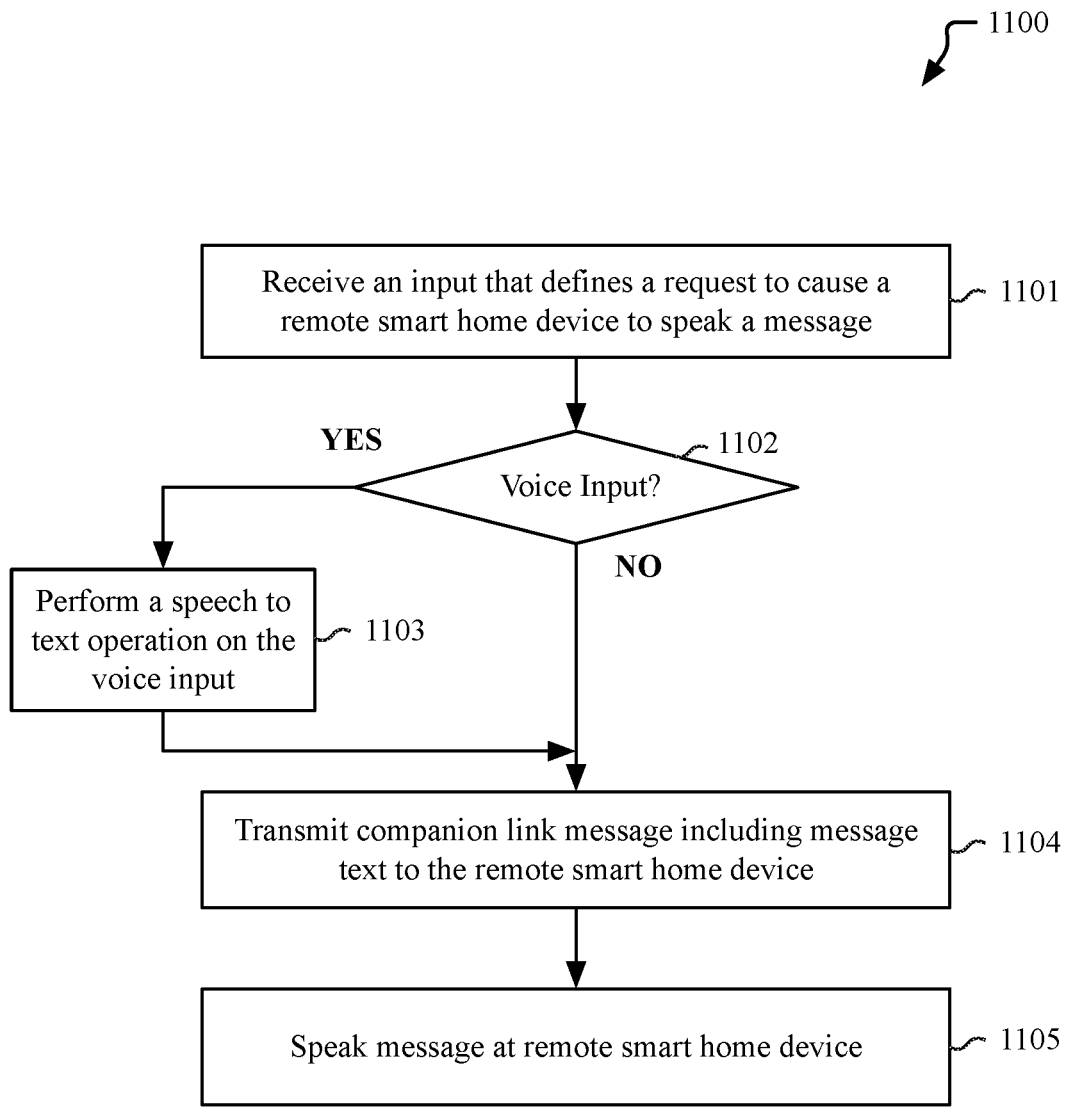
FIG. 11 is a block diagram of mobile device architecture, according to an embodiment.

FIG. 11 is a flow diagram illustrating a method 1100 for sending virtual assistant messages, according to an embodiment. Method 1100 can be implemented on a smart home device as described herein using a virtual assistant as described herein, and as further details in FIG. 14 below. Method 1100 includes for a virtual assistant on a smart home device to receive an input that defines a request to cause a remote smart home device to speak a message (block 1101). The remote smart home device can speak the message via a virtual assistant that executes on the remote smart home device. The input that defines the request can specific the remote home device by which the message is to be spoken and the message to be spoken. In one embodiment the input is a voice input, although other types of inputs can be received, such as a text input. For example, a text message can be sent to the virtual assistant on the smart home device, where the text message defines a request to cause a remote smart home device to speak a message. However, if the input is received as voice input (block 1102), the virtual assistant can perform a speech to text operation on the voice input (block 1103). In one embodiment the speech to text operation can include the assistance of a virtual assistant server 106 as in FIG. 1A-FIG. 1B. Method 1100 additionally includes for the smart home device to transmit a companion link message including message text to the remote smart home device (block 1104). Transmitting the companion link message can be performed using the various techniques of establishing and verifying the security of the companion link that are describe herein. The remote smart home device, for example, via a virtual assistant, can speak the message text using a text to speech capability of the virtual assistant (block 1105).

Additional Exemplary Electronic Devices

Figure 12:
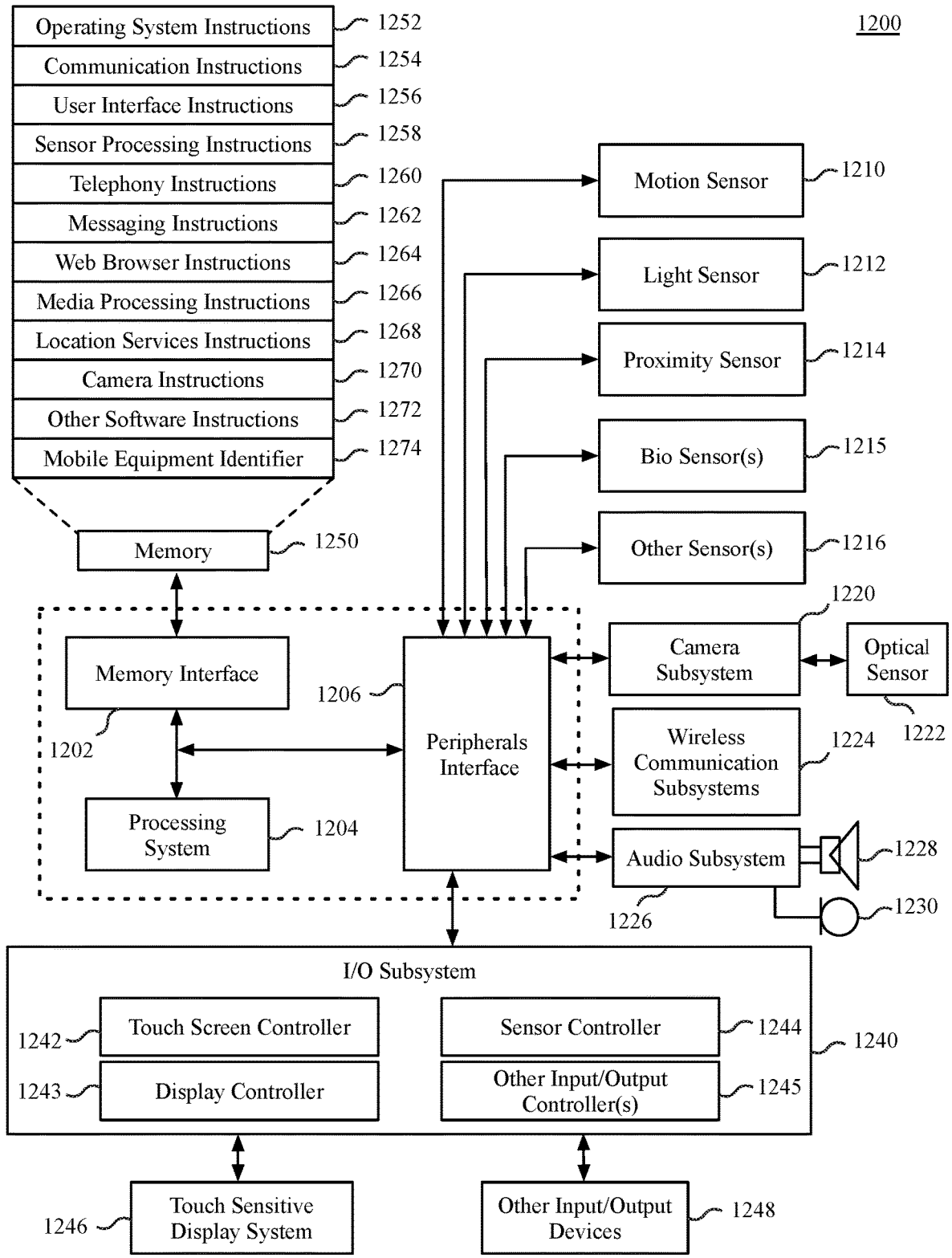
FIG. 12 is a block diagram of a computing system, according to an embodiment.

FIG. 12 is a block diagram of a device architecture 1200 for a mobile or embedded device, according to an embodiment. The device architecture 1200 can be included in mobile devices described herein, such as smart phone devices, table computing devices, and/or wearable electronic devices. Aspects of the device architecture 1200 can also be included in a smart home device as described herein, alone or in combination with aspects of the computing device 600 of FIG. 6. The device architecture 1200 includes a memory interface 1202, a processing system 1204 including one or more data processors, image processors and/or graphics processing units, and a peripherals interface 1206. The various components can be coupled by one or more communication buses or signal lines. The various components can be separate logical components or devices or can be integrated in one or more integrated circuits, such as in a system on a chip integrated circuit.

The memory interface 1202 can be coupled to memory 1250, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1206 to facilitate multiple functionalities. For example, a motion sensor 1210, a light sensor 1212, and a proximity sensor 1214 can be coupled to the peripherals interface 1206 to facilitate the mobile device functionality. One or more biometric sensor(s) 1215 may also be present, such as a fingerprint scanner for fingerprint recognition or an image sensor for facial recognition. Other sensors 1216 can also be connected to the peripherals interface 1206, such as a positioning system (e.g., GPS receiver), a temperature sensor, or other sensing device, to facilitate related functionalities. A camera subsystem 1220 and an optical sensor 1222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1224, which can include radio frequency receivers and transmitters and/or optical (e.g., infrared) receivers and transmitters. The specific design and implementation of the wireless communication subsystems 1224 can depend on the communication network(s) over which a mobile device is intended to operate. For example, a mobile device including the illustrated device architecture 1200 can include wireless communication subsystems 1224 designed to operate over a GSM network, a CDMA network, an LTE network, a Wi-Fi network, a Bluetooth network, or any other wireless network. In particular, the wireless communication subsystems 1224 can provide a communications mechanism over which a media playback application can retrieve resources from a remote media server or scheduled events from a remote calendar or event server.

An audio subsystem 1226 can be coupled to a speaker 1228 and a microphone 1230 to facilitate voice-enabled functions, such as voice recognition, voice replication, digital recording, and telephony functions. Where the illustrated device architecture is included in smart home devices described herein, particularly smart home devices that are tailored for media playback, the audio subsystem 1226 can be a high-quality audio system including support for virtual surround sound and/or multi-channel audio. In some embodiments, multi-channel audio can be enabled using multiple smart home devices that are each configured to play a specific audio channel. The audio-channel configuration can be performed automatically by the smart home devices via communications performed over the companion link.

The I/O subsystem 1240 can include a touch screen controller 1242 and/or other input controller(s) 1245. For computing devices including a display device, the touch screen controller 1242 can be coupled to a touch sensitive display system 1246 (e.g., touch-screen). The touch sensitive display system 1246 and touch screen controller 1242 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1246. Display output for the touch sensitive display system 1246 can be generated by a display controller 1243. In one embodiment, the display controller 1243 can provide frame data to the touch sensitive display system 1246 at a variable frame rate.

In one embodiment, a sensor controller 1244 is included to monitor, control, and/or processes data received from one or more of the motion sensor 1210, light sensor 1212, proximity sensor 1214, or other sensors 1216. The sensor controller 1244 can include logic to interpret sensor data to determine the occurrence of one of more motion events or activities by analysis of the sensor data from the sensors.

In one embodiment, the I/O subsystem 1240 includes other input controller(s) 1245 that can be coupled to other input/control devices 1248, such as one or more buttons, rocker switches, thumb-wheel, infrared port, USB port, and/or a pointer device such as a stylus, or control devices such as an up/down button for volume control of the speaker 1228 and/or the microphone 1230.

In one embodiment, the memory 1250 coupled to the memory interface 1202 can store instructions for an operating system 1252, including portable operating system interface (POSIX) compliant and non-compliant operating system or an embedded operating system. The operating system 1252 may include instructions for handling basic system services and for performing hardware dependent tasks. In some implementations, the operating system 1252 can be a kernel.

The memory 1250 can also store communication instructions 1254 to facilitate communicating with one or more additional devices, one or more computers and/or one or more servers, for example, to retrieve web resources from remote web servers. The memory 1250 can also include user interface instructions 1256, including graphical user interface instructions to facilitate graphic user interface processing.

Additionally, the memory 1250 can store sensor processing instructions 1258 to facilitate sensor-related processing and functions; telephony instructions 1260 to facilitate telephone-related processes and functions; messaging instructions 1262 to facilitate electronic-messaging related processes and functions; web browser instructions 1264 to facilitate web browsing-related processes and functions; media processing instructions 1266 to facilitate media processing-related processes and functions; location services instructions including GPS and/or navigation instructions 1268 and Wi-Fi based location instructions to facilitate location based functionality; camera instructions 1270 to facilitate camera-related processes and functions; and/or other software instructions 1272 to facilitate other processes and functions, e.g., security processes and functions, and processes and functions related to the systems. The memory 1250 may also store other software instructions such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. A mobile equipment identifier, such as an International Mobile Equipment Identity (IMEI) 1274 or a similar hardware identifier can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions may be implemented in hardware and/or in software, including in one or more signal processing and/or application specific integrated circuits.

Figure 13:
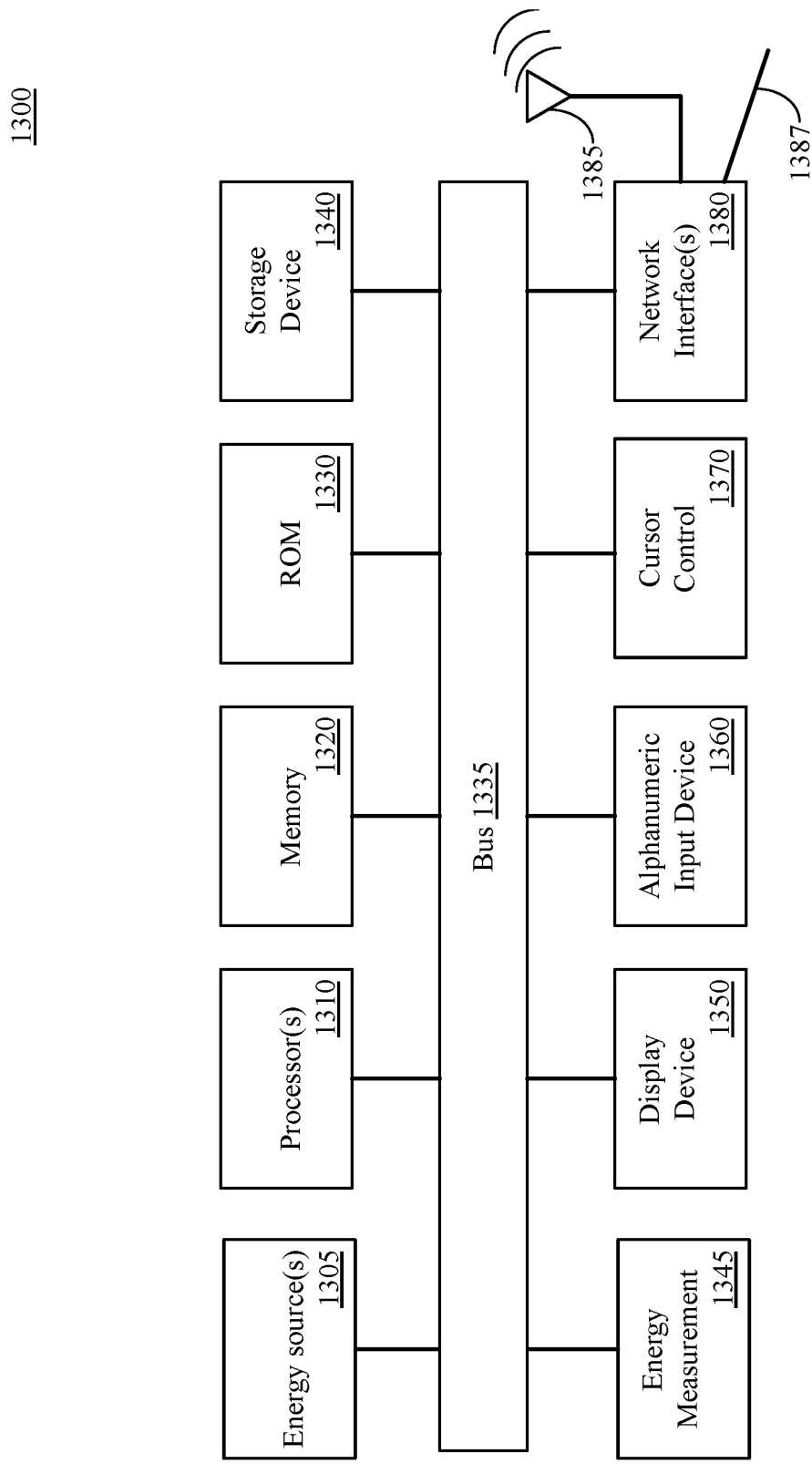
FIG. 13 is a block diagram of a virtual assistant, according to an embodiment.

FIG. 13 is a block diagram of one embodiment of a computing system 1300. The computing system illustrated in FIG. 13 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system of FIG. 13 may be used to provide the computing device and/or a server device to which the computing device may connect.

The computing system 1300 includes bus 1335 or other communication device to communicate information, and processor(s) 1310 coupled to bus 1335 that may process information. While the computing system 1300 is illustrated with a single processor, the computing system 1300 may include multiple processors and/or co-processors. The computing system 1300 further may include memory 1320, such as random-access memory (RAM) or other dynamic storage device coupled to the bus 1335. The memory 1320 may store information and instructions that may be executed by processor(s) 1310. The memory 1320 may also be used to store temporary variables or other intermediate information during execution of instructions by the processor(s) 1310.

The computing system 1300 may also include read only memory (ROM) 1330 and/or another data storage device 1340 coupled to the bus 1335 that may store information and instructions for the processor(s) 1310. The data storage device 1340 can be or include a variety of storage devices, such as a flash memory device, a magnetic disk, or an optical disc and may be coupled to computing system 1300 via the bus 1335 or via a remote peripheral interface.

The computing system 1300 may also be coupled, via the bus 1335, to a display device 1350 to display information to a user. The computing system 1300 can also include an alphanumeric input device 1360, including alphanumeric and other keys, which may be coupled to bus 1335 to communicate information and command selections to processor(s) 1310. Another type of user input device includes a cursor control 1370 device, such as a touchpad, a mouse, a trackball, or cursor direction keys to communicate direction information and command selections to processor(s) 1310 and to control cursor movement on the display device 1350. The computing system 1300 may also receive user input from a remote device that is communicatively coupled via one or more network interface(s) 1380.

The computing system 1300 further may include one or more network interface(s) 1380 to provide access to a network, such as a local area network. The network interface(s) 1380 may include, for example, a wireless network interface having antenna 1385, which may represent one or more antenna(e). The computing system 1300 can include multiple wireless network interfaces such as a combination of Wi-Fi, Bluetooth®, near field communication (NFC), and/or cellular telephony interfaces. The network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, the network interface(s) 1380 may provide access to a local area network, for example, by conforming to IEEE 802.11 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1300 can further include one or more energy sources 1305 and one or more energy measurement systems 1345. Energy sources 1305 can include an AC/DC adapter coupled to an external power source, one or more batteries, one or more charge storage devices, a USB charger, or other energy source. Energy measurement systems include at least one voltage or amperage measuring device that can measure energy consumed by the computing system 1300 during a predetermined period of time. Additionally, one or more energy measurement systems can be included that measure, e.g., energy consumed by a display device, cooling subsystem, Wi-Fi subsystem, or other frequently used or high-energy consumption subsystem.

Virtual Assistant System for Smart Home Devices

Figure 14:
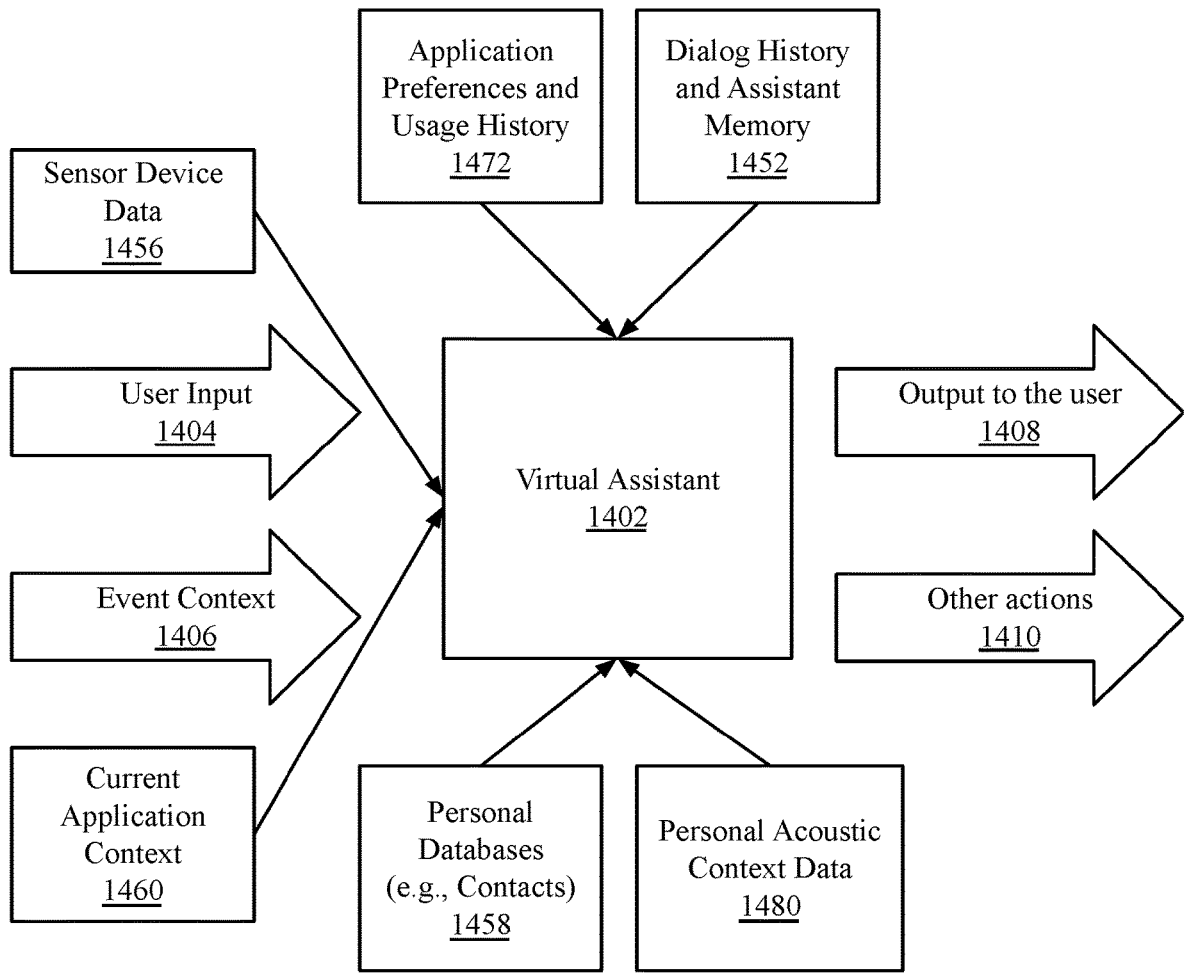
FIG. 14 illustrates a block diagram of a virtual assistant system 1400, according to embodiments described herein.

FIG. 14 illustrates a block diagram of a virtual assistant system 1400, according to embodiments described herein. The illustrated virtual assistant system 1400 is exemplary of one embodiment and is not limiting as to all embodiments described herein. Virtual assistants employed by the various embodiment described herein may include additional, fewer and/or different components or features than those illustrated. The virtual assistant system 1400 includes a virtual assistant 1402 that can accept user input 1404, such as spoken or typed language, processes the input, and generate output 1408 to the user and/or perform 1410 actions on behalf of the user. The virtual assistant 1402 can use context information to supplement natural language or gestural input from a user. Context information can be used to clarify the intent of the user and to reduce the number of candidate interpretations of the user's input. The context information can also reduce the need for the user to provide excessive clarification input. Context can include any available information that is usable by the assistant to supplement explicit user input to constrain an information-processing problem and/or to personalize results. Context can be used to constrain solutions during various phases of processing, including, for example, speech recognition, natural language processing, task flow processing, and dialog generation.

The virtual assistant 1402 can draw on any of a number of different background sources of knowledge and data, such as dictionaries, domain models, and/or task models. From the perspective of the presently described embodiments, such background sources may be internal to the virtual assistant 1402 or can be gathered from one or more remote databases. In addition to user input 1404 and background sources, the virtual assistant 1402 can also draw on information from several sources of context, including, for example, device sensor data 1456, application preferences and usage history 1472, dialog history and assistant memory 1452, personal databases 1458, personal acoustic context data 1480, current application context 1460, and event context 1406.

In one embodiment, a physical device running the virtual assistant 1402, such as a user device, smart media playback device, or smart appliance as described herein, have one or more sensors devices. Such sensors can provide sources of contextual information in the form of device sensor data 1456. Examples of sensor information include, without limitation, the user's current location; the local time at the user's current location; the position, orientation, and motion of the device on which the user is interacting; the current light level, temperature and other environmental measures; the properties of the microphones and cameras in use; the current networks being used, and signatures of connected networks, including Ethernet, Wi-Fi and Bluetooth. Signatures include MAC addresses of network access points, IP addresses assigned, device identifiers such as Bluetooth names, frequency channels and other properties of wireless networks. Sensors can be of any type including for example: an accelerometer, compass, GPS unit, altitude detector, light sensor, thermometer, barometer, clock, network interface, battery test circuitry, and the like.

The current application context 1460 refers to the application state or similar software state that is relevant to the current activity of the user. For example, the user could be using a text messaging application to chat with a particular person. The Virtual assistant 1402 need not be specific to or part of the user interface of the text messaging application. Instead, the virtual assistant 1402 can receive context from any number of applications, with each application contributing its context to inform the virtual assistant 1402. If the user is currently using an application when the virtual assistant 1402 is invoked, the state of that application can provide useful context information. For example, if virtual assistant 1402 is invoked from within an email application, context information may include sender information, recipient information, date and/or time sent, subject, data extracted from email content, mailbox or folder name, and the like.

In one embodiment, information describing the user's application preferences and usage history 1472 includes preferences and settings for various applications, as well usage history associated with those applications. Application preferences and usage history 1472 is used as context for interpreting and/or operationalizing the user's intent or other functions of the virtual assistant 1402. Examples of such application preferences and usage history 1472 include, without limitation, shortcuts, favorites, bookmarks, friends lists, or any other collections of user data about people, companies, addresses, phone numbers, places, web sites, email messages, or any other references; recent calls made on the device; recent text message conversations, including the parties to the conversations; recent requests for maps or directions; recent web searches and URLs; stocks listed in a stock application; recent songs or video or other media played; the names of alarms set on alerting applications; the names of applications or other digital objects on the device; and the user's preferred language or the language in use at the user's location.

Another source of context data is the personal database 1458 of a user on a device such as a phone, such as for example an address book containing names and phone numbers. In one embodiment, personal information of the user obtained from personal databases 1458 are used as context for interpreting and/or operationalizing the user's intent or other functions of the virtual assistant 1402. For example, data in a user's contact database can be used to reduce ambiguity in interpreting a user's command when the user referred to someone by first name only. Examples of context information that can be obtained from personal databases 1458 include, without limitation, the user's contact database (address book)—including information about names, phone numbers, physical addresses, network addresses, account identifiers, important dates—about people, companies, organizations, places, web sites, and other entities that the user might refer to; the user's own names, preferred pronunciations, addresses, phone numbers, and the like; the user's named relationships, such as mother, father, sister, boss, and the like; the user's calendar data, including calendar events, names of special days, or any other named entries that the user might refer to; the user's reminders or task list, including lists of things to do, remember, or get that the user might refer to; names of songs, genres, playlists, and other data associated with the user's music library that the user might refer to; people, places, categories, tags, labels, or other symbolic names on photos or videos or other media in the user's media library; titles, authors, genres, or other symbolic names in books or other literature in the user's personal library.

Another source of context data is the user's dialog history with the virtual assistant 1402. Such history may include, for example, references to domains, people, places, and so forth. For example, a user can ask "What's the time in New York?". The virtual assistant 1402 can respond by providing the current time in New York City. The user can then ask, "What's the weather?". The virtual assistant 1402 ca use the previous dialog history to infer that the location intended for the weather query is the last location mentioned in the dialog history.

Examples of context information from dialog history and virtual assistant memory include, without limitation, people mentioned in a dialog; places and locations mentioned in a dialog; current time frame in focus; current application domain in focus, such as email or calendar; current task in focus, such as reading an email or creating a calendar entry; current domain objects in focus, such as an email message that was just read or calendar entry that was just created; current state of a dialog or transactional flow, such as whether a question is being asked and what possible answers are expected; history of user requests; history of results of user requests, such as sets of restaurants returned; history of phrases used by the assistant in dialog; and facts that were told to the assistant by the user.

In one embodiment, personal acoustic context data 1480 be used to select from possible statistical language models that may be used to understand user speech, or otherwise tune the speech recognition to optimize for recognized acoustical contexts. When interpreting speech input, the virtual assistant 1302 can tune a speech to text service to consider the acoustic environments in which the speech is entered. For example, the noise profiles of a quiet office are different from those of automobiles or public places. If a speech recognition system can identify and store acoustic profile data, these data can also be provided as contextual information. When combined with other contextual information such as the properties of the microphones in use, the current location, and the current dialog state, acoustic context can aid in recognition and interpretation of input.

In the foregoing specification, the invention has been described regarding specific embodiments thereof. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment.

Embodiments described herein provide a communication mechanism that enables a communal electronic device, such as a smart speaker device or another smart home device, to relay or redirect virtual assistant requests involving personal user data to a companion device, which is a personal user device associated with the user for which access to private data is requested. The communication mechanism can also be used as a general-purpose communication mechanism that enables smart home device to exchange data, including configuration data.

Communication between the communal device and the companion device can be performed on a secure data channel referred to as a companion link. The companion link provides a persistent, low-latency messaging system for connected devices within a home network environment. In some embodiments, the companion link supports the linking of stationary communal devices within a home, such as speaker devices, with personal mobile devices in the home or reachable via the Internet. The companion link enables the communal devices to redirect of personal requests, which the communal device otherwise cannot handle due to privacy concerns, to one or more personal devices. The redirection of the personal requests to a personal device associated with a user can enable a virtual assistant on a communal device to receive and requests in a privacy-preserving manner.

In addition to enabling the redirection of personal queries to companion devices, in one embodiment the companion link also provides a general-purpose messaging system for devices within the home network environment. The general-purpose messaging system enables multiple home devices to work in concert by exchanging messages over the companion link. For example, audio playback between multiple smart speaker devices can be coordinated to enable the devices to perform operations such as, but not limited to coordinating playback of media items, selectively providing audio notifications to a user via the speaker closets to a user, configuring multiple speakers into a multi-channel audio system, or coordinating audio ducking at a speaker during the duration of a spoken request and response.

Communal devices can advertise support for the companion link service over a discovery protocol. Personal user devices on the same network as the communal device can discover the companion link service advertised by the communal device and connect with the communal device using advertised information. The personal device can perform a pairing process with the communal device to become a companion device for a user. In one embodiment, the pairing process includes a proximity element in which the user device exchanges identifiers, keys, or secrets with the companion device over a short-range wireless communication mechanism. The pairing process can also include the exchange of presence and reachability information that can facilitate subsequent connections between communal and companion devices over the companion link.

Embodiments described herein provide a communication mechanism that enables a communal electronic device, such as a smart speaker device or another smart home device, to relay or redirect virtual assistant requests involving personal user data to a personal user device for processing. The communication mechanism can also be used as a general-purpose communication mechanism that enables smart home device to exchange data, including configuration data. It will, however, be evident that various modifications and changes can be made thereto without departing from the broader spirit and scope of the invention. The specification and drawings are, accordingly, to be regarded in an illustrative rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described in accordance with an embodiment.

One embodiment provides a data processing system on a communal electronic device, the data processing system comprising a memory device to store instructions and one or more processors to execute the instructions stored on the memory device. The instructions to cause the one or more processors to provide a virtual assistant to receive commands at the communal electronic device, where the virtual assistant, via the one or more processors, is configured to receive a command at the communal electronic device and determine whether the command is to access personal data of a user associated with the communal electronic device. In response to a determination that the command is to access personal data of the user, the virtual assistant can send a request to a personal electronic device of the user to process at least a portion of the command.

In embodiments described herein, personal data of the user includes a contact list, text message, e-mail, call history, alarm, reminder, communication history, settings, preferences, or location history, and the communal electronic device includes a smart speaker device. The personal data can be stored on the personal electronic device of the user and the virtual assistant can request the personal electronic device to access personal data on behalf of the communal electronic device. The virtual assistant can then receive output of a request sent to the personal electronic device of the user and to complete processing of a command based on the output. The command can be a voice command spoken by a user or a text command transmitted to the communal device. In one embodiment, to send a request to the personal electronic device of the user includes to redirect a command to the personal electronic device of the user, where the personal electronic device is to process the command on behalf of the communal electronic device. The virtual assistant can receive an audio response generated by the personal electronic device and play the audio response as a response to the command. If the command is a command to send a message to a contact of the user, the audio response can be a notification of a received reply to the message.

In one embodiment the communal electronic device can establish a pair and/or trust relationship with the personal electronic device before the communal electronic device is enabled to send the request to the personal electronic device. The virtual assistant can send the request to a personal electronic device of the user over a verified data connection with the personal electronic device. The verified data connection can be established based on the trust relationship with the personal electronic device, where the verified data connection is verified via data exchanged during establishment of the trust relationship. In one embodiment the verified data connection established over a remote data connection established via a wide area network, such as the Internet. Personal data of the user is data that is specific to the user and can include data that is inherently personal or private, or data that is designated as personal or private. Personal data can also include data that can be used to specifically identify the user.

One embodiment provides a non-transitory machine-readable medium storing instruction to cause one or more processors to perform operations comprising determining that a communication session is to be established between a communal electronic device and a companion device, where the companion device is an electronic device having access to personal data associated with a user. The operations additionally include establishing a data connection with the companion device, verifying a trust relationship between the communal electronic device and the companion device, establishing an encrypted communication session between the communal electronic device and the companion device after verifying the trust relationship, and relaying a command received at the communal electronic device to the companion device over the encrypted communication session.

One embodiment provides for an electronic device comprising a network interface to connect to one or more networks and a memory device to store instructions and personal data associated with a user of the electronic device. The electronic device includes one or more processors to execute the instructions stored on the memory device, where the instructions to cause the one or more processors to provide a virtual assistant to receive commands. The virtual assistant, via the one or more processors, can receive, via the network interface, a command redirected from a communal electronic device. The command can include or specify a request to access personal data associated with a user of the electronic device. The virtual assistant can then process at least a portion of the command on behalf of the communal electronic device and transmit, via the network interface, output of processing performed on behalf of the communal electronic device to the communal electronic device.

While a companion link connection is described between a communal electronic device, such as a smart speaker device and a companion device, such as a smartphone device, a companion link connection can also be established between multiple companion devices, such as multiple smartphone devices, table computing devices, or between a smartphone device and a table computing device.

One embodiment provides for a data processing system on an electronic device, the data processing system comprising a memory device to store instructions and one or more processors to execute the instructions stored on the memory device. The instructions, when executed, cause the one or more processors to enable an encrypted data channel between electronic devices. To enable the encrypted data channel, the one or more processors are configured to determine that a communication session is to be established between a first electronic device and a second electronic device, wherein the first electronic device and the second electronic device are each associated with a cloud services account. The one or more processors can be further configured to establish a peer-to-peer data connection between the first electronic device and the second electronic device, verify a trust relationship between the first electronic device and the second electronic device, and establish an encrypted communication session between the first electronic device and the second electronic device after verifying the trust relationship. The encrypted communication session can then be used to exchange data between the first electronic device and the second electronic device over the encrypted communication session.

In a further embodiment, the one or more processors of the data processing system can establish the peer-to-peer data connection over a short-range wireless connection between the first electronic device and the second electronic device and/or establish the encrypted communication session via a network layer protocol over a wireless network connection. To verify the trust relationship between the first electronic device and the second electronic device can include to verify a previously established trust relationship, which can be established via one or more of an exchange of credentials between the first electronic device and the second electronic device over a short-range wireless connection and/or an exchange of credentials via the cloud services account associated with the first electronic device and the second electronic device, the credentials to enable mutual authentication between the first electronic device and the second electronic device.

In a further embodiment, the one or more processors can be configured to determine that the communication session is to be established between the first electronic device and the second electronic device in response to discovering the second electronic device at the first electronic device via a device discovery protocol and establish the peer-to-peer data connection between the first electronic device and the second electronic device after discovering the second electronic device. The communication session can also be established based on a list of devices associated with the cloud services account to which the first device and the second device are associated. In one embodiment the communication session can be established based on a list of devices associated with a family of cloud services accounts, where the first electronic device is associated with a first account, the second electronic device is associated with a second account, and the family of cloud services accounts includes the first account and the second account. In one embodiment, the first electronic device to establish a trust relationship with the second electronic device before the first electronic device is enabled to send a request for a data exchange to the second electronic device.

One embodiment provides for a non-transitory machine-readable medium storing instructions to cause one or more processors to perform operations comprising determining that a communication session is to be established between a first electronic device and a second electronic device, where the first electronic device and the second electronic device are each associated with a cloud services account. The instructions can additionally cause the one or more processors to perform additional operations that include establishing a peer-to-peer data connection between the first electronic device and the second electronic device, verifying a trust relationship between the first electronic device and the second electronic device, establishing an encrypted communication session between the first electronic device and the second electronic device after verifying the trust relationship, and exchanging data between the first electronic device and the second electronic device over the encrypted communication session.

One embodiment provides for a method to be executed on a computing device or data processing system described herein. The method comprises determining that a communication session is to be established between a first electronic device and a second electronic device, where the first electronic device and the second electronic device are each associated with a cloud services account, establishing a peer-to-peer data connection between the first electronic device and the second electronic device via a wireless radio device, and verifying a trust relationship between the first electronic device and the second electronic device, where verifying the trust relationship between the first electronic device and the second electronic device includes verifying a previously established trust relationship. The method additionally includes establishing an encrypted communication session between the first electronic device and the second electronic device via a network layer protocol over a wireless network connection, the encrypted communication session established after verifying the trust relationship and exchanging data between the first electronic device and the second electronic device over the encrypted communication session. The data can be exchanged, for example, to synchronize device data between the first electronic device and the second electronic device, where the device data is associated with the cloud services account.

In a further embodiment, the method additionally comprises determining that a communication session is to be established between the first electronic device and the second electronic device based on a list of devices associated with a family of cloud services accounts, where the first electronic device is associated with a first account, the second electronic device is associated with a second account, and the family of cloud services accounts includes the first account and the second account. The first electronic device can discover the second electronic device via a device discovery protocol and establish the peer-to-peer data connection with the second electronic device after discovering the second electronic device.

In an additional embodiment, the general-purpose communication mechanism described herein can be leveraged to enable intercom-like transmission of audio or video data between electronic devices that are connected to the communication mechanism. The media intercom system can be implemented within the companion-link framework without requiring extensive additional program logic at higher operating system levels. The libraries and daemons that enable companion link communication can provide an application programming interface (API) that enables smart home devices to form an intercom system, by which audio and/or video data can be streamed between smart home devices.

One embodiment provides for an electronic device comprising a network interface coupled with a bus, a microphone coupled with the bus, a non-transitory machine-readable medium coupled with the bus, and one or more processors coupled with the bus. The one or more processors can execute instructions stored on the non-transitory machine readable medium, wherein the instructions are to provide an application programming interface (API) to cause the one or more processors to stream intercom media data from the electronic device to a smart home device connected via the network interface. To stream the intercom media data, the one or more processors are to transmit a buffer of media data to the smart home device via the network interface over a secure connection established with the smart home device. The secure connection can be established with the smart home device via the API. The buffer of media data includes audio data captured via the microphone. The audio data is live or substantially live audio data that is captured contemporaneously in time with the transmission of the buffer. In one embodiment, the media data can also include video data captured via a camera on the electronic device.

One embodiment provides for a non-transitory machine-readable medium storing instructions to cause one or more processors of a smart home device to perform operations comprising receiving a request to initiate an intercom media stream from a remote smart home device to the smart home device, verifying a secure connection between the remote smart home device and the smart device, wherein the secure connection is an encrypted peer-to-peer connection, activating a media session for the intercom media stream, the media session established with the remote smart home device, receiving recorded media from the remote smart home device, and playing the recorded media via an output device of the smart home device.

Other features of the present embodiments will be apparent from the accompanying drawings and from the detailed description above. Accordingly, the true scope of the invention will become apparent to the skilled practitioner upon a study of the drawings, specification, and following claims.

What is claimed is:

1. An electronic device comprising:
a network interface coupled with a bus;
a microphone coupled with the bus;
a non-transitory machine-readable medium coupled with the bus; and
one or more processors coupled with the bus, the one or more processors to execute instructions stored on the non-transitory machine-readable medium, wherein the instructions are to:
access an application programming interface (API) provided directly on the electronic device to cause the one or more processors to stream intercom media data from the electronic device to a smart home device connected to the electronic device via the network interface,
wherein to stream the intercom media data includes to transmit a buffer of media data to the smart home device via the network interface over a secure connection established with the smart home device, the secure connection established with the smart home device via the API,
wherein the buffer of media data includes audio data captured via the microphone, the audio data captured contemporaneously with transmission of the buffer of media data.

2. The electronic device as in claim 1, wherein the secure connection established with the smart home device is an encrypted peer-to-peer connection established via the API.

3. The electronic device as in claim 2, wherein the smart home device is a smart speaker device or another connected media playback device.

4. The electronic device as in claim 2, wherein the smart home device is a smart home appliance device.

5. The electronic device as in claim 2, the one or more processors additionally to:
receive a request via the API provided directly on the electronic device to initiate a media stream from the electronic device to the smart home device, the electronic device to connect with the smart home device via the network interface and establish the secure connection, via the API, with the smart home device;
verify the secure connection established with the smart home device; and
activate a media session with the smart home device, the media session to establish context data to facilitate transmission of the buffer of media data to the smart home device.

6. The electronic device as in claim 5, wherein to verify the secure connection established with the smart home device includes to verify a trust relationship between the electronic device and the smart home device.

7. The electronic device as in claim 6, wherein to verify the trust relationship between the electronic device and the smart home device includes to verify a previously established trust relationship between the electronic device and the smart home device.

8. The electronic device as in claim 1, additionally including a camera device, wherein the buffer of media data additionally includes video data captured via the camera device, the video data captured contemporaneously with transmission of the buffer of media data.

9. The electronic device as in claim 1, wherein the smart home device is a first smart home device and the one or more processors are further to transmit the buffer of media data via the network interface over a secure connection established with a second smart home device.

10. The electronic device as in claim 1, wherein the smart home device is a first smart home device and the API is to cause the one or more processors to transmit the buffer of media data via the network interface over a secure connection established with a second smart home device.

11. The electronic device as in claim 1, wherein the API is to cause the one or more processors to receive a buffer of media data from the smart home device, the one or more processors further to decode the buffer of media data and play decoded media data via one or more output devices of the electronic device.

12. A method comprising:
accessing, by an electronic device, an application programming interface (API) provided directly on the electronic device to cause one or more processors of the electronic device to initiate streaming intercom media data from the electronic device to a smart home device connected to the electronic device via a network interface of the electronic device; and streaming the intercom media data to the smart home device including transmitting a buffer of media data to the smart home device via the network interface over a secure connection established with the smart home device, the secure connection established with the smart home device via the API, wherein the buffer of media data includes audio data captured via a microphone of the electronic device, the audio data captured contemporaneously with transmission of the buffer of media data.

13. The method of claim 12, wherein the secure connection established with the smart home device is an encrypted peer-to-peer connection established via the API.

14. The method of claim 13, wherein the smart home device is a smart speaker device or another connected media playback device.

15. The method of claim 13, wherein the smart home device is a smart home appliance device.

16. The method of claim 12, further comprising:
receiving a request via the API provided directly on the electronic device to initiate a media stream from the electronic device to the smart home device, the electronic device to connect with the smart home device via the network interface and establish the secure connection, via the API, with the smart home device;
verifying the secure connection established with the smart home device; and
activating a media session with the smart home device, the media session to establish context data to facilitate transmission of the buffer of media data to the smart home device.

17. A non-transitory machine-readable medium comprising instructions that, when executed by one or more processors, cause the one or more processors to perform operations comprising:
accessing, by an electronic device, an application programming interface (API) provided directly on the electronic device to cause one or more processors of the electronic device to initiate streaming intercom media data from the electronic device to a smart home device connected to the electronic device via a network interface of the electronic device; and
streaming the intercom media data to the smart home device including transmitting a buffer of media data to the smart home device via the network interface over a secure connection established with the smart home device, the secure connection established with the smart home device via the API,
wherein the buffer of media data includes audio data captured via a microphone of the electronic device, the audio data captured contemporaneously with transmission of the buffer of media data.

18. The non-transitory machine-readable medium of claim 17, wherein the secure connection established with the smart home device is an encrypted peer-to-peer connection established via the API.

19. The non-transitory machine-readable medium of claim 18, wherein the smart home device is a smart speaker device or another connected media playback device.

20. The non-transitory machine-readable medium of claim 18, wherein the smart home device is a smart home appliance device.

* * * * *